US007607573B1

(12) United States Patent
Gromley et al.

(10) Patent No.: US 7,607,573 B1
(45) Date of Patent: Oct. 27, 2009

(54) BANKING SYSTEM OPERATED RESPONSIVE TO DATA BEARING RECORDS

(75) Inventors: Neil Gromley, Kensington, OH (US); Todd Christian, Dalton, OH (US); James Pellegrene, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 41 days.

(21) Appl. No.: 12/004,758

(22) Filed: Dec. 21, 2007

Related U.S. Application Data

(60) Provisional application No. 60/878,284, filed on Jan. 3, 2007.

(51) Int. Cl.
*G07F 19/00* (2006.01)
*G06K 5/00* (2006.01)

(52) U.S. Cl. ...................................... 235/379; 235/382

(58) Field of Classification Search ................ 235/379, 235/382; 705/35; 70/63; 109/6, 56, 57; 340/545.1, 545.6, 569
See application file for complete search history.

(56) References Cited

U.S. PATENT DOCUMENTS

| | | | | |
|---|---|---|---|---|
| 4,608,932 | A * | 9/1986 | Bohland et al. | 109/56 |
| 5,701,828 | A * | 12/1997 | Benore et al. | 109/56 |
| 6,129,029 | A * | 10/2000 | Watson | 109/56 |
| 6,612,142 | B1 * | 9/2003 | Capwell | 70/355 |
| 6,694,217 | B2 * | 2/2004 | Bloom | 700/215 |
| 7,295,110 | B2 * | 11/2007 | Mercier et al. | 340/545.6 |
| 7,497,376 | B2 * | 3/2009 | Landwirth et al. | 235/382 |
| 2006/0232381 | A1 * | 10/2006 | Gauthier | 340/5.73 |
| 2007/0113606 | A1 * | 5/2007 | Carter | 70/337 |
| 2007/0256615 | A1 * | 11/2007 | Delgrosso et al. | 109/38 |

* cited by examiner

*Primary Examiner*—Thien M. Le
*Assistant Examiner*—April A Taylor
(74) *Attorney, Agent, or Firm*—Ralph E. Jocke; Daniel D. Wasil; Walker & Jocke

(57) ABSTRACT

A system for use in banking operates responsive to data included in data bearing records. The system is suitable for securing the contents in safety deposit boxes or similar locked receptacles, and selectively permits access to key locks only to individuals who have been determined to be authorized to have such access. Each safety deposit box or other receptacle includes a door (16) with at least one key lock (22, 24) thereon. The assembly includes a body (32) that is held in a blocking position by a cover lock. A selectively programmable data bearing electronic key module (28) is operative to change the condition of a selected cover lock from a latched to an unlatched condition. Electronic key modules are appropriately programmed to enable the particular user access to key locks on a particular safety deposit box, through operation of a customer station (126).

57 Claims, 26 Drawing Sheets

BANKING SYSTEM OPERATED RESPONSIVE TO DATA BEARING RECORDS

CROSS REFERENCE TO RELATED APPLICATION

This application claims benefit pursuant to 35 U.S.C. § 119(e) of Provisional Application Ser. No. 60/878,284 filed Jan. 3, 2007 the disclosure of which is incorporated herein by reference.

TECHNICAL FIELD

This invention relates to banking systems that are operated responsive to data included on data bearing records that may be classified in U.S. Class 235, Subclass 379.

BACKGROUND ART

Safety deposit boxes may be used by banking customers to store valuables. Banks commonly provide a plurality of safety deposit boxes in a vault or other secure area. Customers of the bank may rent the safety deposit box for a fee. Banking customers may store valuable documents and other items in their safety deposit box and may access them when desired at times when the bank is open. An example of an embodiment of a safety deposit box is shown in U.S. Pat. No. 4,608,932 the disclosure of which is incorporated herein by reference.

Safety deposit boxes commonly include two key locks. Each of the two key locks must be opened by a corresponding respective key in order for the safety deposit box to be opened. One of the key locks is actuated by a guard key. The guard key is held by the bank. The same guard key may be operative to open the guard lock on some or all of a plurality of safety deposit boxes in the bank.

A second key lock on a safety deposit box is the customer lock. The customer lock can only be opened by a unique key which is given to the particular customer who has leased the safety deposit box.

Commonly a customer wishing to access their safety deposit box will travel to the bank at a time when the bank is open. During normal business hours it is common for the main vault door to be either open or capable of being unlocked. In cases where the vault door is open, access to the interior of the vault may nonetheless be controlled by a locked day gate or other structure, which can be unlocked with a key or other device. A teller or other bank employee is informed by the customer that they wish to access their safety deposit box. The bank employee then verifies the identity of the customer and that they have leased a safety deposit box with the bank. Upon verifying this information the bank employee then escorts the customer into the vault. The bank employee unlocks and opens the day gate to provide access if such a day gate is being used.

Once in the vault the bank employee then uses the appropriate guard key to place the guard lock on the customer's safety deposit box in an unlocked condition. This often involves extending the guard key in the key opening of the guard lock and turning the lock to the open position. The bank employee then typically observes the customer place their key in the customer lock. The customer then inserts the key in the key opening and turns it, thereby opening the lock. When the guard lock and the customer lock are both placed in the unlocked positions the safety deposit box door is enabled to be opened.

Typically once the customer has opened the safety deposit box they remove a container held therein which holds the customer's items. The bank employee then escorts the safety deposit box customer to an appropriate area where the customer may privately access the contents of the container. Once the customer has finished they will return to their safety deposit box, reinsert the container, close the safety deposit box door and lock the customer lock. This returns the safety deposit box to the locked condition. The customer then takes their key from the customer lock. The bank employee then returns the guard lock to the locked position, removes the guard key from the guard lock, and escorts the customer from the vault.

While this process for accessing a safety deposit box is effective, it is also labor intensive for the bank. As a result systems have been devised in which a customer is enabled to access the contents of their safety deposit box with less involvement of the bank's employees. These systems involve placing a guard key of each guard lock in connection with the lock in a fixed unlocked condition. In this way each safety deposit box door can be opened using only the customer key for the corresponding customer lock. The bank may manually or electronically limit access to the vault to those persons who have leased safety deposit boxes. Such persons may then act unsupervised to open their respective box, access the contents and close it when they are finished. This can sometimes be accomplished without involvement of bank employees.

A potential drawback associated with such an approach is that the unescorted user within the vault may engage in improper activities. This may include for example, attempting to open other safety deposit boxes that are not those of the user. This may be done through the use of one or more keys that have been fabricated and/or modified for this purpose. If the unscrupulous user is able to open a safety deposit box without authorization, they may take the valuable contents thereof without being detected. In addition it may be many months before the rightful owner of the safety deposit box has occasion to check the contents and discover that items have been taken. This long time period between when the crime is committed and when it is discovered, further makes it difficult to determine who is responsible for the criminal activity.

As a result improved systems may be beneficial.

OBJECTS OF EXEMPLARY EMBODIMENTS

It is an object of an exemplary embodiment to provide a banking system that is operated responsive to data that is included on data bearing records.

It is an object of an exemplary embodiment to provide a system that limits access to certain items or areas to authorized users.

It is a further object of an exemplary embodiment to provide a safety deposit box system that limits access to a particular safety deposit box only to the authorized user.

It is a further object of an exemplary embodiment to provide a system for controlling access to safety deposit boxes which can be retrofit to existing safety deposit boxes.

It is an object of an exemplary embodiment to provide a system for providing access to safety deposit boxes that may be operated on a self-service basis.

It is an object of an exemplary embodiment to provide a safety deposit box system that provides enhanced security.

It is an object of an exemplary embodiment to provide a method of operation for a safety deposit box system.

Further objects of exemplary embodiments will be made apparent in the following Detailed Description of Exemplary Embodiments and the appended claims.

The foregoing objects are accomplished in an exemplary embodiment by a system and method which is used in conjunction with the pre-existing safety deposit box system. The pre-existing system includes safety deposit boxes each of which has a door which controls access to an interior area of the safety deposit box. Each door of a safety deposit box has thereon a customer key lock and a guard key lock. In the exemplary embodiment a guard key common to multiple safety deposit boxes is required to unlock the guard key lock, and then a customer key which is unique to the particular safety deposit box is required to open the customer key lock.

In the exemplary embodiment an assembly is mounted in permanent relation to the door of each safety deposit box. The assembly includes a base and a body which is mounted in movable hinged relation relative to the base. The base includes a pair of apertures, each aperture corresponding to the area of the key locks on the respective door. The apertures provide respective key access to each of the customer key opening and guard key opening.

In the exemplary embodiment the body is positionable in a blocking position in which it overlies each of the key openings. The assembly further includes a cover lock which is operative to hold the body in a latched condition. In the latched condition the cover lock holds the body so that the key openings of the locks are inaccessible to a user.

In the exemplary embodiment the assembly further includes a wireless indicator. The wireless indicator, which in the exemplary embodiment is a radio frequency identification (RFID) indicator, is operative to provide signals that correspond to data that uniquely identifies a particular safety deposit box on which the assembly is mounted relative to the plurality of other safety deposit boxes housed in the particular vault.

In the exemplary embodiment a data bearing record in the form of an electronic key module is used to change the condition of the cover lock from the latched condition to an unlatched condition. Once in the unlatched condition, the body may be moved to expose at least one of the key openings of the particular safety deposit box. Once the body has been moved from the blocking position to the exposing position, a holder of the appropriate key for the safety deposit box may then unlock the customer lock. Further in some exemplary embodiments the guard lock may be held generally in the unlocked condition. This may be done using a bent key or other mechanism suitable for holding the guard lock in the unlocked condition.

The exemplary electronic key module includes a reader that is operative to read the RFID indicators on assemblies that are attached to safety deposit boxes. The electronic key module further includes at least one processor and at least one data store in operative connection with the processor. The exemplary electronic key module further includes an actuator in operative connection with the at least one processor. The actuator is operative to move at least one movable portion on the electronic key module.

In the exemplary embodiment a safety deposit box user wishing to access their safety deposit box operates a user terminal located at the bank and positioned externally of the vault. The user provides inputs through one or more input devices in operative connection with the user terminal. The user terminal is operative responsive to the one or more inputs provided by the user to verify that the user is an authorized holder of rights to a safety deposit box, and to determine the particular safety deposit box that the user is authorized to access. The at least one computer that is part of the user terminal is also operative to determine data corresponding to the RFID indicator on the particular assembly attached to the safety deposit box that the user is authorized to access. The at least one computer operates to include data in the at least one data store of the electronic key module that corresponds to the data that the electronic key module can read from the RFID indicator. The programming of this data into the at least one data store of the electronic key module is operative to enable the electronic key module to change the cover lock on the assembly attached to the door of the user's safety deposit box to an unlatched condition.

Responsive to the user identifying themselves in a satisfactory manner in accordance with the programming of the user terminal, the user is directed by at least one output device to take an electronic key module from a docking station adjacent to the user terminal. The user may be guided to the particular electronic key module through lights or other indicators. In the exemplary embodiment a locked day gate controlling access to the vault, is opened responsive to the user taking the electronic key module from the docking station. Of course in alternative embodiments the day gate may be controlled by an electronic lock or other means which the specific authorized user may open using the electronic key module or one or more other inputs that were used to identify themself to the user terminal. Of course these approaches are exemplary.

In the exemplary embodiment once the user has accessed the vault, the user is enabled to insert an extending portion of the electronic key module into an opening in the cover of the assembly attached to the door of the user's respective safety deposit box. In the exemplary embodiment the electronic key module includes a display thereon. The display operates responsive to the processor to output identifying numbers and/or letters which correspond to the user's safety deposit box. In the exemplary embodiment the safety deposit boxes are labeled with identifying indicia to facilitate the user finding their particular safety deposit box.

Upon insertion of the extended portion of the electronic key module into the opening in the body of the assembly, a reader of the electronic key module is operative to read signals from the RFID indicator included in the assembly. The at least one processor in the electronic key module is operative to produce data corresponding to the signals from the RFID indicator and compare the read data to data stored in the at least one data store. The at least one processor is operative to make a determination if the data read by the electronic key module corresponds to the stored data programmed into the at least one data store which corresponds to the safety deposit box that the user is authorized to access.

If the processor in the electronic key module makes a determination that the data read from the RFID indicator is the appropriate data for the safety deposit box the user is authorized to open, the actuator of the electronic key module moves a movable portion on the extending portion of the electronic key module. Movement of this movable portion in the exemplary embodiment is operative to engage a bolt of the cover lock as the electronic key module is being moved relative to the body. Movement of the bolt is operative to change the condition of the cover lock from the latched condition to the unlatched condition. Changing the condition of the cover lock enables the body to move relative to the base portion and the safety deposit box door. Movement of the body enables access to the customer key opening. The customer is then enabled to insert their key into the customer key opening and open the lock on their safety deposit box.

In the exemplary embodiment the assembly includes a catch. The catch is operative to hold the extending portion of the electronic key module in the opening of the body while the cover lock is in the unlatched position. This helps to minimize the risk that the electronic key module will be misplaced by the user or inadvertently placed in the interior of the user's safety deposit box.

In the exemplary embodiment the at least one processor in the electronic key module is operative to carry out a timing function. The timing function is operative to determine a time that the cover lock is opened. The timing function is also operative to determine the length of time that the electronic key module is engaged with the assembly. Data corresponding to this information is stored in the at least one data store of the electronic key module. Further in the exemplary embodiment, if the user places the electronic key module in an opening of an assembly, that the electronic key module is not programmed to open, the at least one processor records this information and the time thereof in the at least one data store. In this manner the exemplary electronic key module maintains a record of the use of the electronic key module as well as any potentially improper activity that the user has attempted to engage in.

In the exemplary embodiment the user who has completed their activity returns the container to their safety deposit box, closes the safety deposit box door, and turns and removes their key from the customer key lock. In the exemplary embodiment the customer's key is held in the key opening when the customer key lock is in the open position. This prevents the body from being moved to the blocking position at any time while the safety deposit box door is open. However, once the safety deposit box door has been re-secured and the customer key removed, the body may be moved relative to the base into the blocking position overlying the customer key opening. A member in operative connection with the catch is moved responsive to the body moving to the blocking condition and releases the catch. In addition moving the body to the blocking position is operative to engage the bolt which holds the base and the body in operatively engaged relation in the blocking position.

In the exemplary embodiment once the body is in the blocking position the user may remove the electronic key module from the assembly, and exit the vault. The user then returns the electronic key module to the docking station. The at least one computer connected to the user terminal communicates with the electronic key module to recover the data stored in the at least one data store therein. The at least one computer is operative to record information about the time that the user accessed their safety deposit box and how long the module was engaged with the assembly as well as other information recorded in the data store, such as data associated with attempts to improperly open other boxes. Of course these approaches are exemplary.

The exemplary system further includes other features which may be used to help assure proper operation of the system. For example the at least one processor in the electronic key module is operative to carry out a program that determines conditions that are likely indicative of a failure to return the electronic key module after use. For example the processor may execute a timing function which is operative to cause an audio output device in the electronic key module to begin providing an audible output if the electronic key module is not returned to the docking station within a particular time after it is disengaged from the assembly. Alternatively or in addition, wireless signal output devices may be provided in the area of the safety deposit boxes. These output signals may be received by the electronic key module and used by the processor to determine that its current position is within an authorized area of use. Upon the failure of the electronic key module to sense these wireless signals, the at least one processor may cause the electronic key module to output audible signals. Alternatively or in addition, a wireless signal generator may be positioned in an area through which bank customers must pass to exit the bank or other area within the bank. The electronic key module may operate in response to sensing such signals to output audible or other signals. Therefore if a user has failed to return the electronic key module to its docking station and attempts to exit the bank, the electronic key module provides an audible reminder to return the electronic key module to its docking station. Of course these approaches are exemplary.

In still other exemplary embodiments the computer operatively connected to the user terminal may be in operative connection with one or more surveillance systems. The surveillance systems may be operative to observe and record user activities when operating the system. Recording images and other data related to such operation may minimize the risk of improper activities.

In still other exemplary embodiments the system may be connected to at least one computer which is operative to maintain data regarding authorized users of the system and the regular activities related to safety deposit boxes. Such exemplary systems may be operative to determine payments owed by users of the system. Such a computer may be operative to assess charges for use of the system, such as by sending invoices deducting rental amounts from user accounts or other activities as appropriate.

Of course it should be understood that the features and methods described are exemplary and in other embodiments other approaches may be used within the scope of the claimed inventions.

DETAILED DESCRIPTION OF EXEMPLARY EMBODIMENTS

Figure 1:
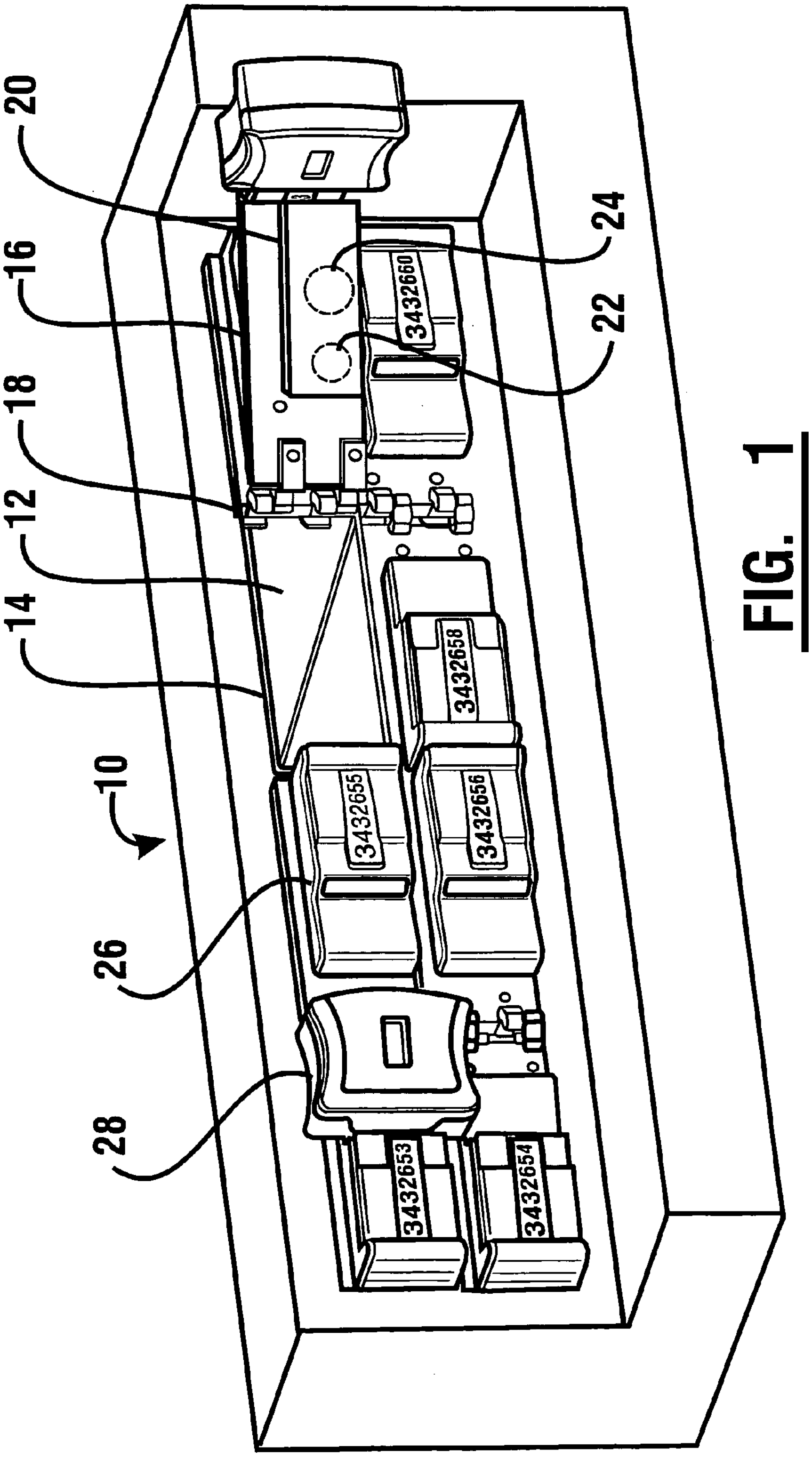
FIG. 1 is an isometric view showing safety deposit boxes used in an exemplary embodiment.

Referring now to the drawings and particularly FIG. 1, there is shown therein a plurality of safety deposit boxes generally indicated 10. Of course it should be understood that while only eight safety deposit boxes are shown, systems of exemplary embodiments may include large numbers of safety deposit boxes. Each safety deposit box has an interior area 12 which is bounded by a frame 14. Each safety deposit box further includes a door 16. The door is operatively connected to the frame through a door hinge 18 positioned at a first side of the door. Each door has mounted thereon a lock 20. The lock 20 includes key locks of the type previously discussed. These include a guard lock 22 and a customer lock 24, each of which are shown in phantom in FIG. 1. As previously discussed, these locks can be changed between the locked and unlocked conditions responsive to keys inserted and turned in key openings of the respective locks. In the open condition of both of the locks, a bolt (not separately shown) is moved from an extended position in which the door is held closed, to a retracted position relative to lock 20 so that the door 16 may be opened.

In the exemplary embodiment each safety deposit box door has attached thereto an assembly 26 which is described in greater detail hereafter. The assembly is selectively operative to block access to at least one of the key lock openings of the guard lock and the customer lock. The assembly is operatively engageable with an electronic key module 28, also described in greater detail hereafter. The electronic key module is operative to enable the assembly to change condition so as to enable an authorized user to have key access to a key lock opening of the respective safety deposit box lock.

Figure 2:
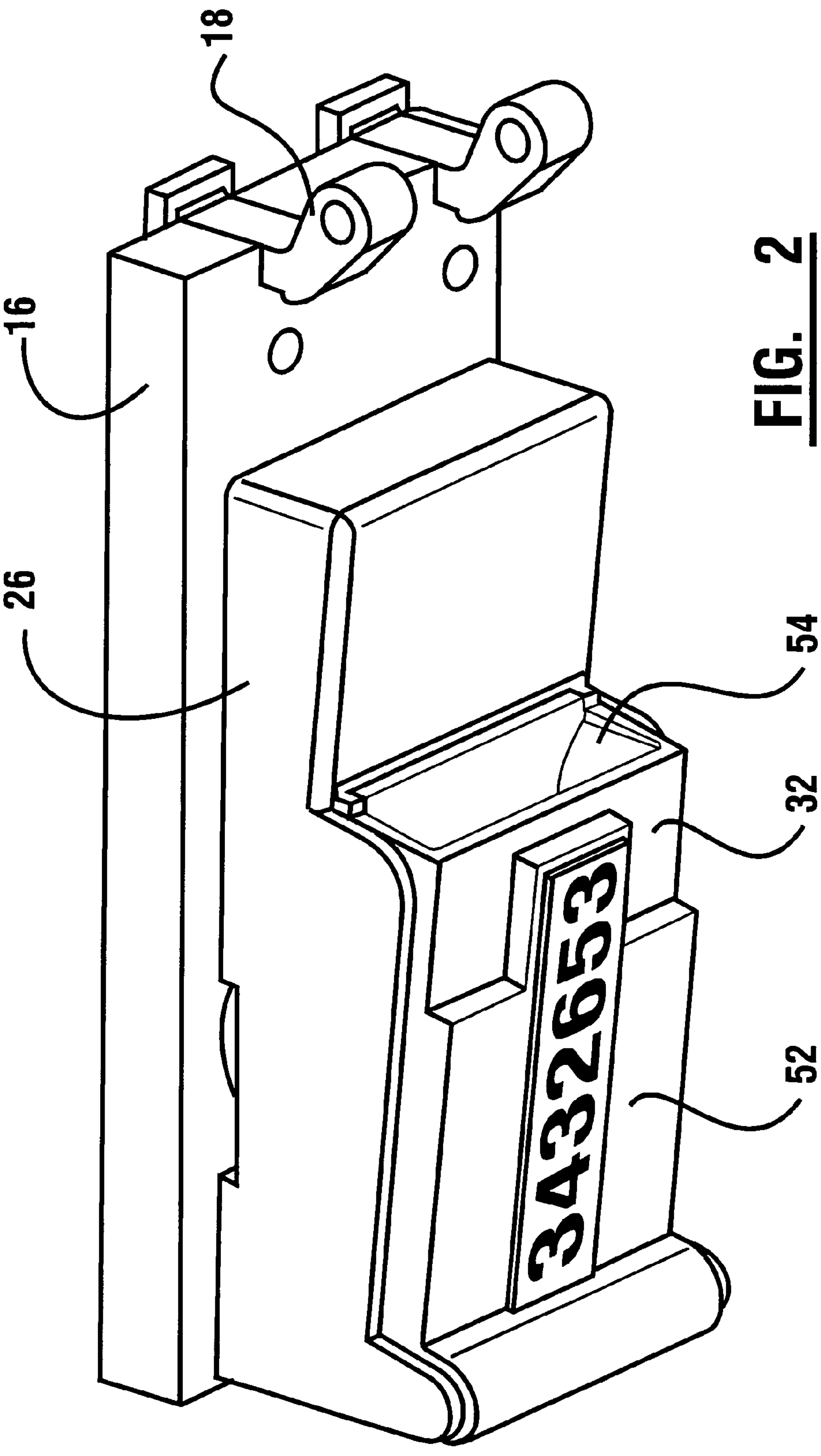
FIG. 2 is an isometric view of a safety deposit box door including an assembly controlling access to key locks of the safety deposit box door.
Figure 3:
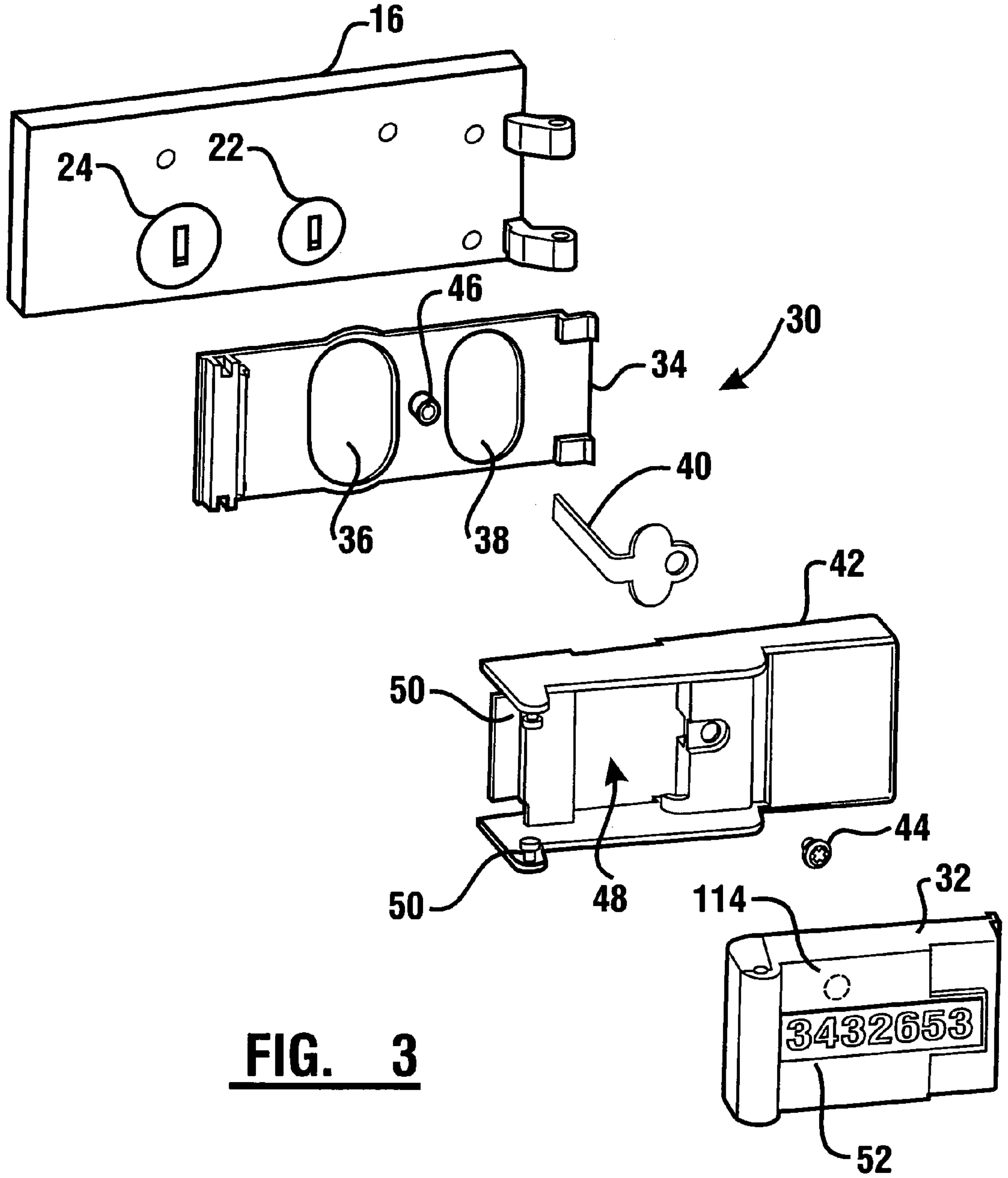
FIG. 3 is an exploded view of the safety deposit box door and assembly for controlling access to the key openings on the door.
Figure 4:
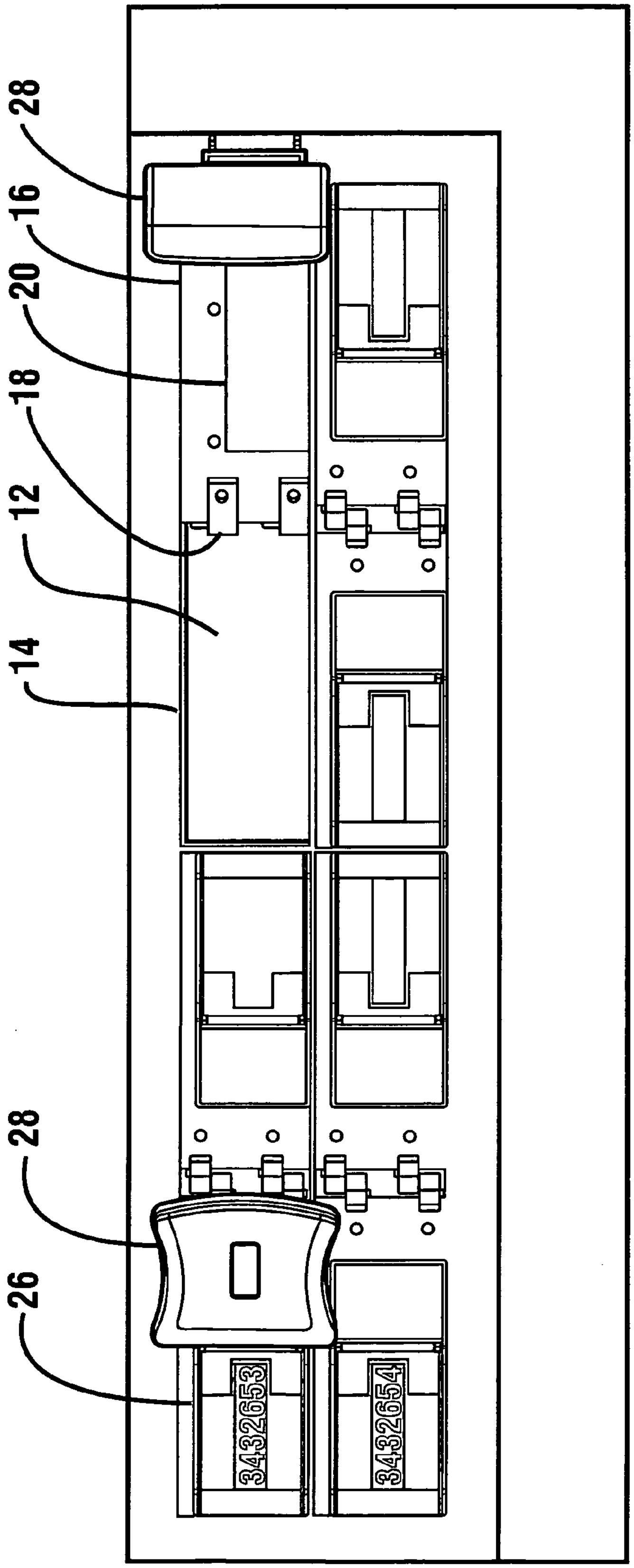
FIG. 4 is a plan view of safety deposit boxes including the engagement of an electronic key module therewith.
Figure 5:
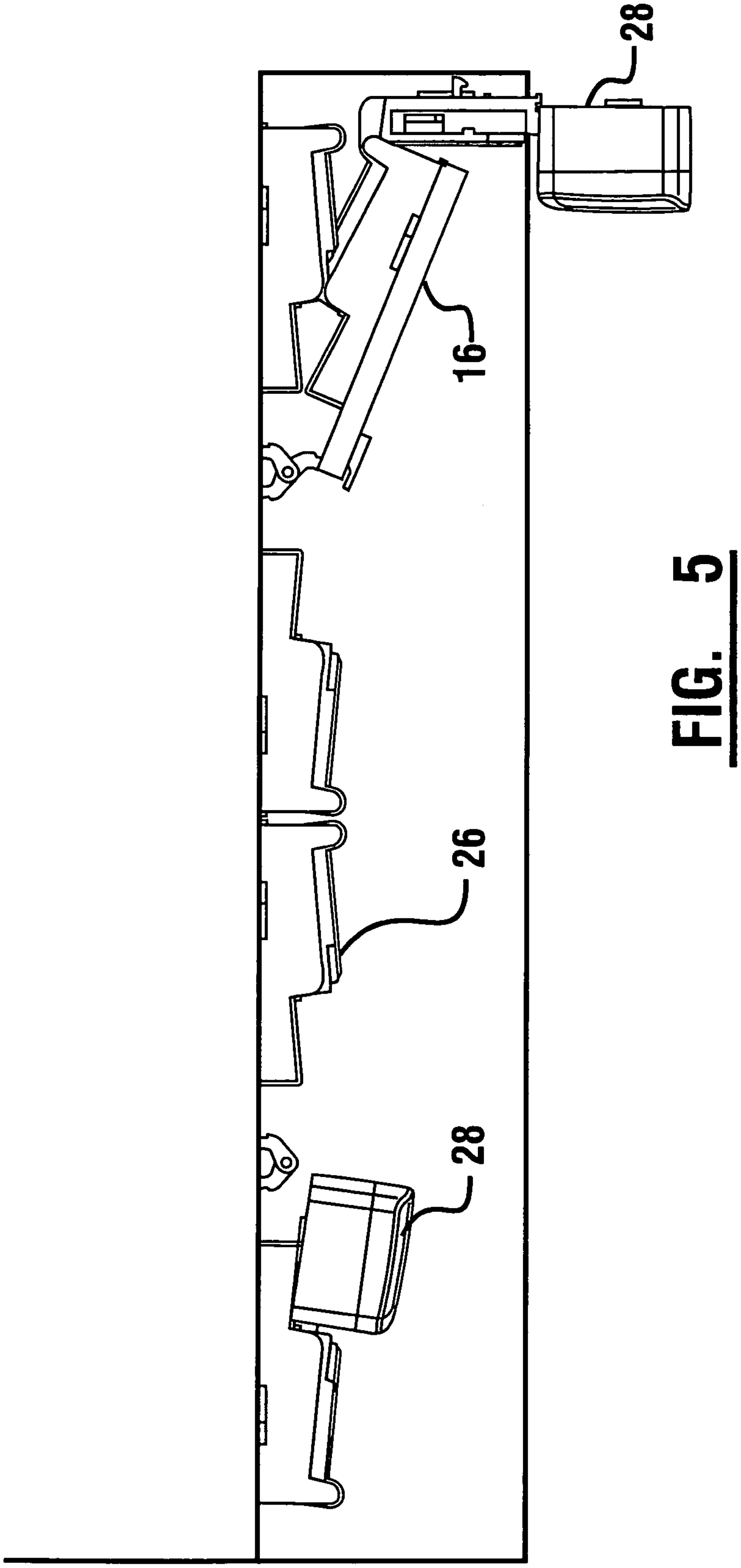
FIG. 5 is a top view corresponding to FIG. 4.

The assembly 26 of the exemplary embodiment includes as shown in FIGS. 2 and 3, a base 30 and a body 32. In the exemplary embodiment the base includes a plate 34. Plate 34 includes an aperture 36 and an aperture 38 therethrough. Plate 34 of an exemplary embodiment is configured to be attached to the door 16 through adhesive or other suitable material which is intended to achieve a permanent attachment thereto. Plate 34 is configured such that when installed, aperture 36 generally surrounds the outer face of customer lock 24 and aperture 38 surrounds the outer face of guard lock 22. In the exemplary embodiment aperture 38 is operative to accept therein a guard key portion 40. In the exemplary embodiments the guard key portion is a bent key or a key with at least a portion of the head removed, which is inserted in the guard lock opening and is operative to retain the guard lock in an unlocked condition. Of course it should be understood that this approach is exemplary and in other embodiments other approaches such as key stubs, slugs or other devices suitable to hold the guard lock in an unlocked condition may be used. In some embodiments adhesive tape or other suitable holding material may also be used to hold the key and guard lock in an unlocked condition.

In the exemplary embodiment the base 30 further includes a shroud 42. Shroud 42 generally overlies the base. A fastener 44 extends through the shroud and engages a fastener opening 46 of the plate. In the exemplary embodiment the shroud includes a customer key access area 48 which provides access to the key opening of the customer lock 24. In the exemplary embodiment the shroud overlies the guard key lock and the bent key 40. Of course this approach is exemplary and in other embodiments other approaches may be used.

The exemplary shroud further includes hinge pins 50. Hinge pins 50 engage corresponding recesses in body 32. The hinge pins are made such that they generally permanently attach the body 32 to the shroud 42 in movably mounted relation. As can be appreciated, the hinge formed by the hinge pins in engagement with the body enable the body to be rotationally moved relative to the base. Such movement enables the body to be moved between a blocking position in which the body overlies the key opening of the customer lock and an exposing position wherein the body is disposed from the customer key opening. In the exposing position of the body the customer is enabled access to the customer lock by inserting their key in the key lock opening. Of course it should be understood that this approach is exemplary.

As shown in FIGS. 2 and 3 in the exemplary embodiment the body includes visible identifying indicia 52 thereon. The identifying indicia is operative to enable a user to identify uniquely their particular safety deposit box. In addition as shown in FIG. 2, the body 32 includes an opening therein 54. Opening 54 is adapted to receive an extending portion of an electronic key in the manner later discussed.

Figure 14:
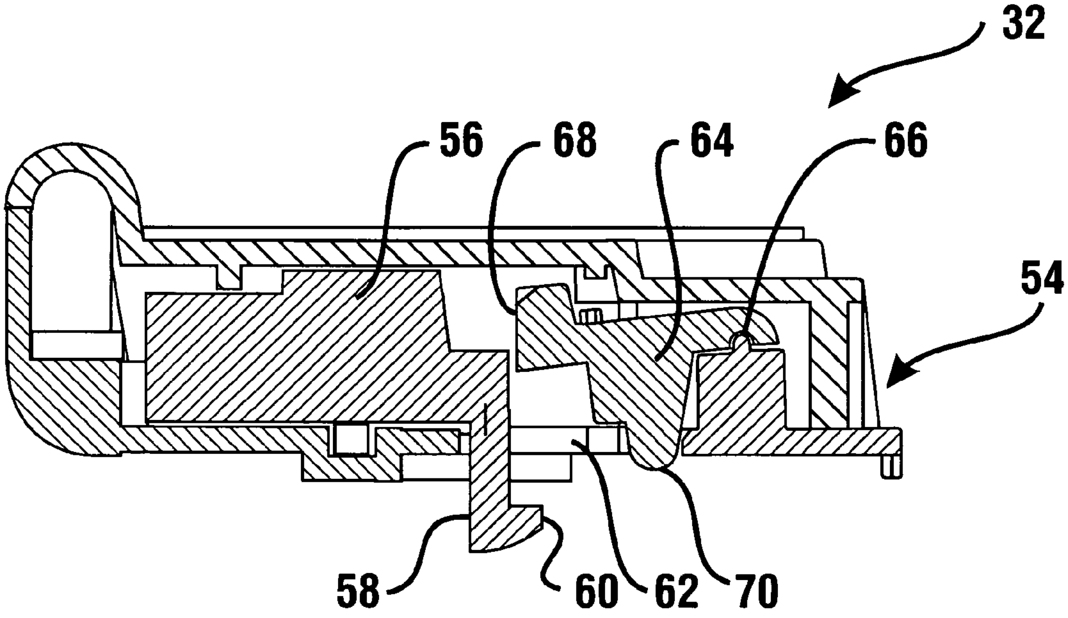
FIG. 14 is a longitudinal sectional view of the body portion of the assembly.

FIGS. 12 through 15 show exemplary body 32 in greater detail. Body 32 includes a bolt 56. Bolt 56 includes a pair of disposed leg portions 58. Leg portions 58 each terminate in a latching tab 60. In the exemplary embodiment leg portions 58 are sized to straddle an extending portion of the electronic key module when the extending portion is placed in the opening 54. The leg portions 58 further extend in openings 62 in the sides of the body that face the shroud. Further in the exemplary embodiment, the bolt 56 is biased toward the right as shown in FIG. 14. Latch 56 is biased by a spring or other suitable biasing device which is not separately shown. In the exemplary embodiment bolt 56 is part of a cover lock. As can be appreciated when the bolt is disposed to the right of the position shown in FIG. 14, the tabs 60 operatively engage portions of the base portion so as to hold the body 32 in the blocking position. Of course it should be understood that this cover lock configuration is exemplary and in other embodiments other approaches may be used.

Figure 15:
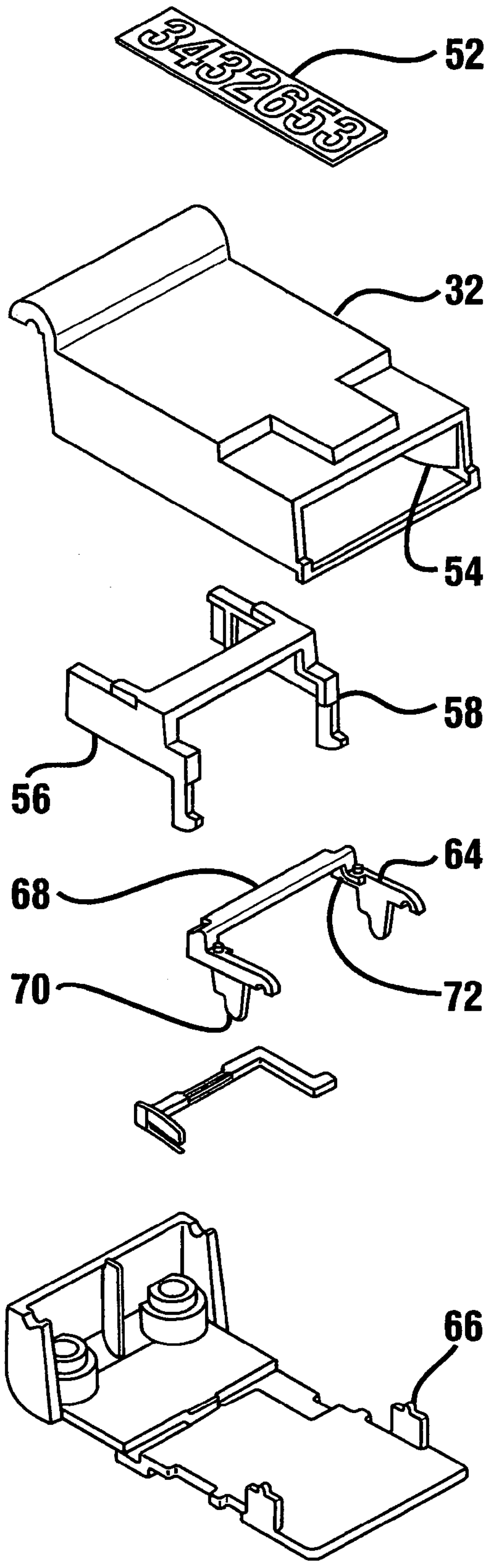
FIG. 15 is an exploded view showing the body portion of the assembly.

The exemplary body portion further includes a catch. The exemplary catch is operative to hold the extending portion of the electronic key module in the opening when the key module has been used to place the assembly and cover lock in an unlocked position. The exemplary catch includes a member 64. Exemplary member 64 is rotatably movable about a pivot 66 on each side as best shown in FIGS. 14 and 15. Member 64 is biased to rotate in a counter-clockwise direction about the pivots by springs (not separately shown) which provide a biasing force that acts downward in the lock as shown in FIG. 14.

The exemplary form of the member 64 includes an extending surface 68. The extending surface 68 is operative to engage the bolt 56 and hold it in the retracted position once the bolt has been moved to such position and the body has been moved away from the blocking position. This is represented in FIG. 14. Member 64 further includes a pair of disposed projecting portions 70. The projecting portions 70 generally extend through corresponding openings in the body. The projecting portions are operative to engage the outer surface of the shroud when the body is moved to the blocking position. As can be appreciated when the projecting portions are moved by engagement with the shroud, the extending surface 68 moves upward as shown in FIG. 14 relative to the forward face of the bolt 56. This enables the bolt 56 to move in response to the biasing force of the spring such that the tabs 60 move to the right as the mechanism is shown in FIG. 14. As can be appreciated, moving the body from the exposing position in which the customer key lock opening is accessible, to the blocking position, causes by the engagement of the projecting portions with the shroud, the cover lock to be automatically changed from the unlatched condition to the latched condition. Of course it should be understood that this configuration is exemplary and in other embodiments other approaches may be used.

In the exemplary embodiment the member 64 further includes internally extending projections 72 best shown in FIG. 15. These projections are configured to engage corresponding recesses on the extending portion of the electronic key module which are later discussed. As a result in the exemplary embodiment, when the member 64 is moved to the position shown in FIG. 14 the projections 72 are moved inwardly relative to the opening. This enables the member 64 to hold the extending portion of the module in the opening and to serve the function of the catch until the member 64 is moved away from the opening through the action caused by placing the body in the blocking position. Of course it should be understood that this construction is exemplary and in other embodiments other approaches may be used.

Figure 16:
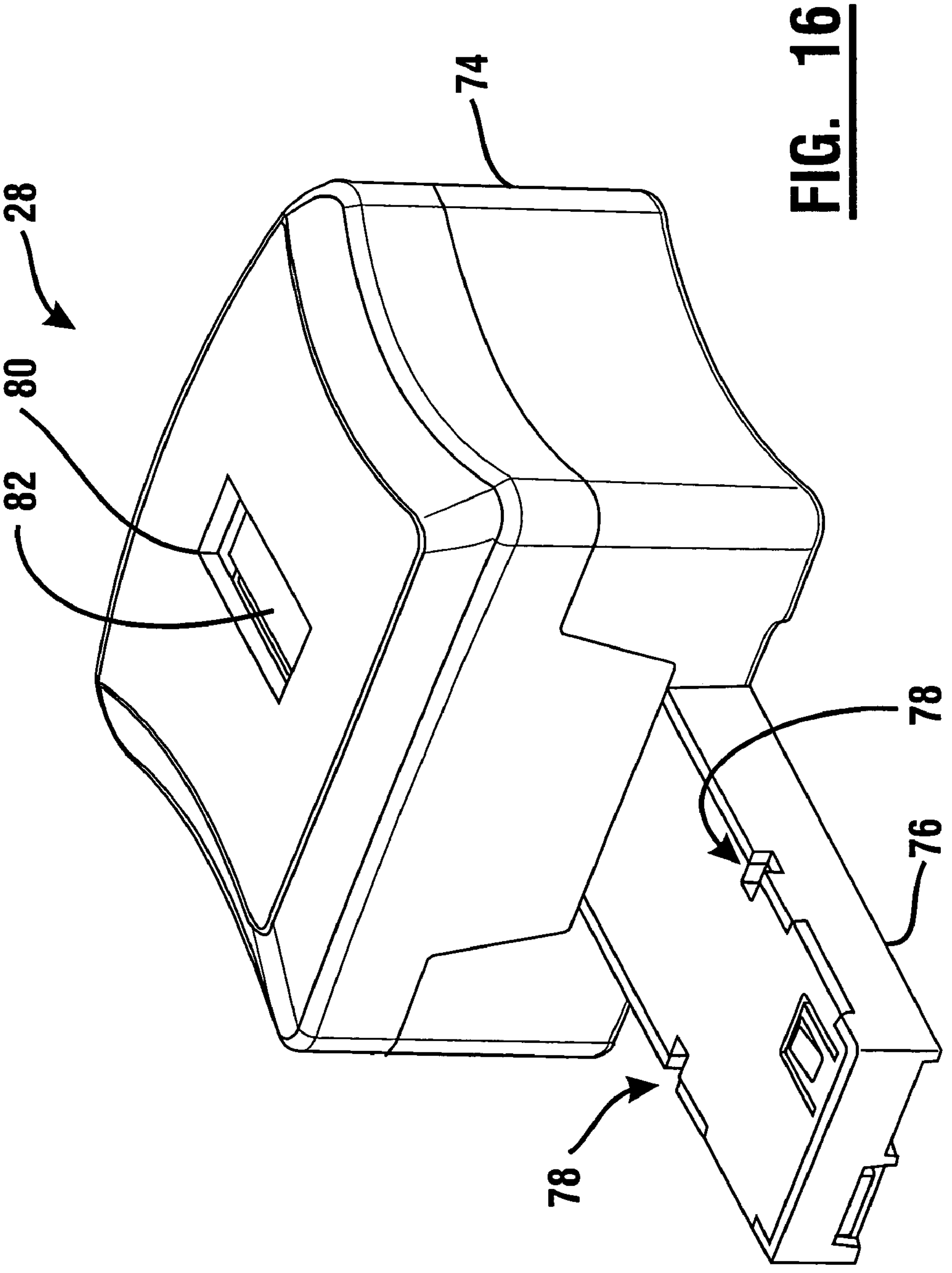
FIG. 16 is an isometric view of an exemplary electronic key module.
Figure 17:
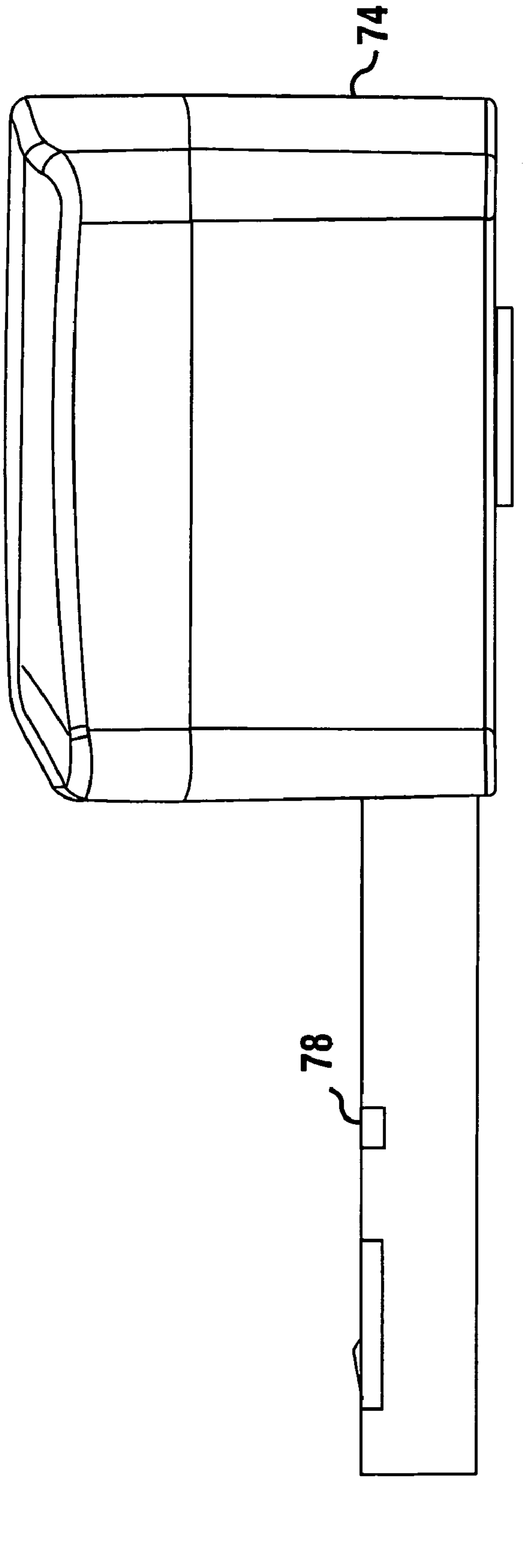
FIG. 17 is a side view of the electronic key module shown in FIG. 16.

FIGS. 16 through 19 show an exemplary embodiment of the electronic key module 28. The electronic key module includes a housing 74. Housing 74 includes a generally rectangular extending portion 76. Extending portion 76 is sized to be accepted in the opening 54 of the body 32. As shown in FIG. 16 the extending portion includes recesses 78. As previously discussed the recesses 78 are configured to accept projections 72 therein. This enables the catch of body 32 to hold the electronic key module therein when the cover lock thereof is moved into the unlocked position.

Figure 18:
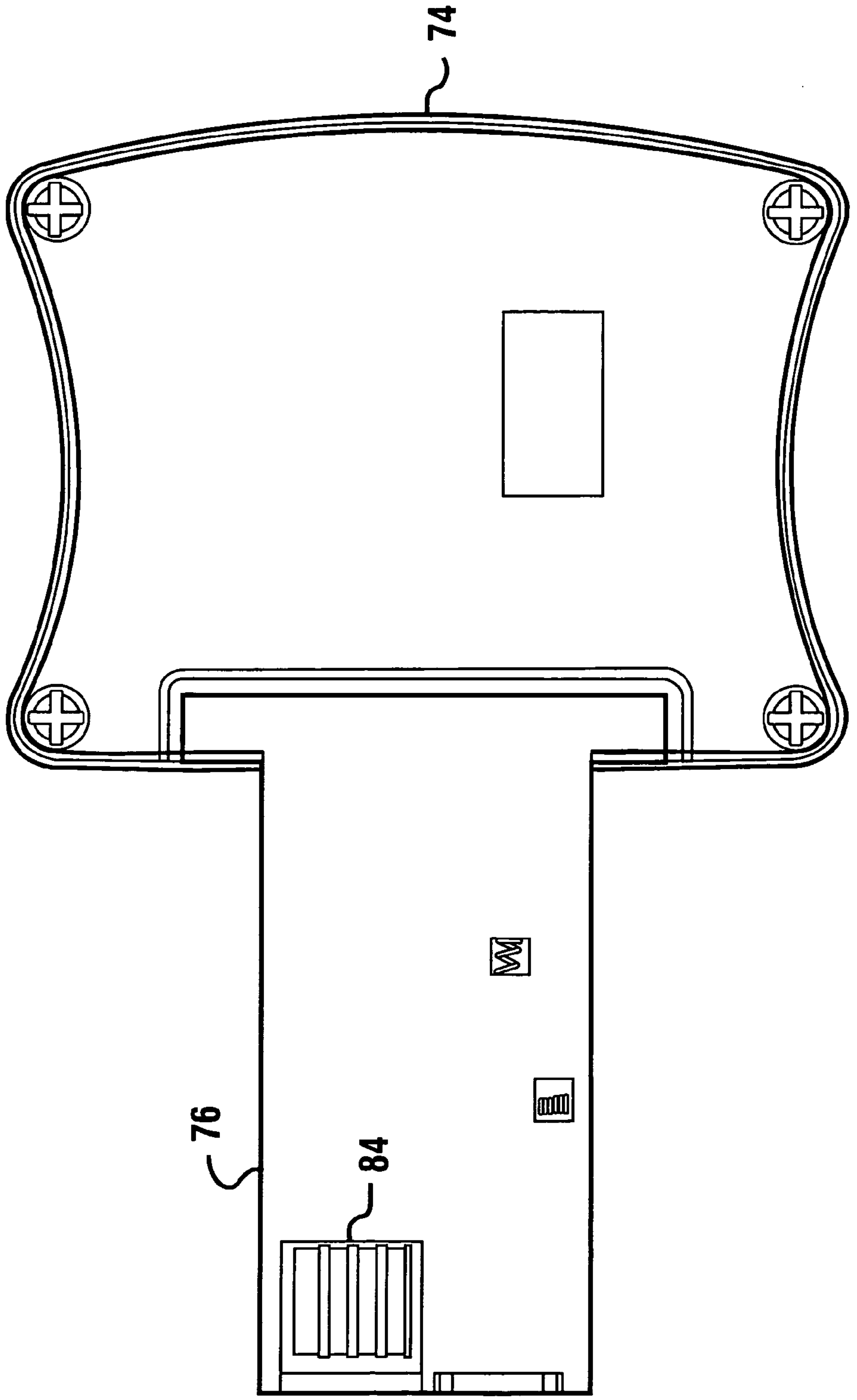
FIG. 18 is a back view of the electronic key module.

In the exemplary embodiment the housing 74 includes an opening 80 therein. Opening 80 provides visual access to display 82 as later discussed. Further and as best shown in FIG. 18, the extending portion includes a plurality of connectors 84 thereon. Connectors 84 are operative in the exemplary embodiment to provide electrical connections between the electronic key module and a docking station. Such electrical connections may be used in the manner later discussed for purposes of delivering data to or receiving data from at least one data store in the electronic key module, charging the internal battery of the electronic key module or performing other functions. Of course these approaches are exemplary and in other embodiments other approaches may be used.

Figure 19:
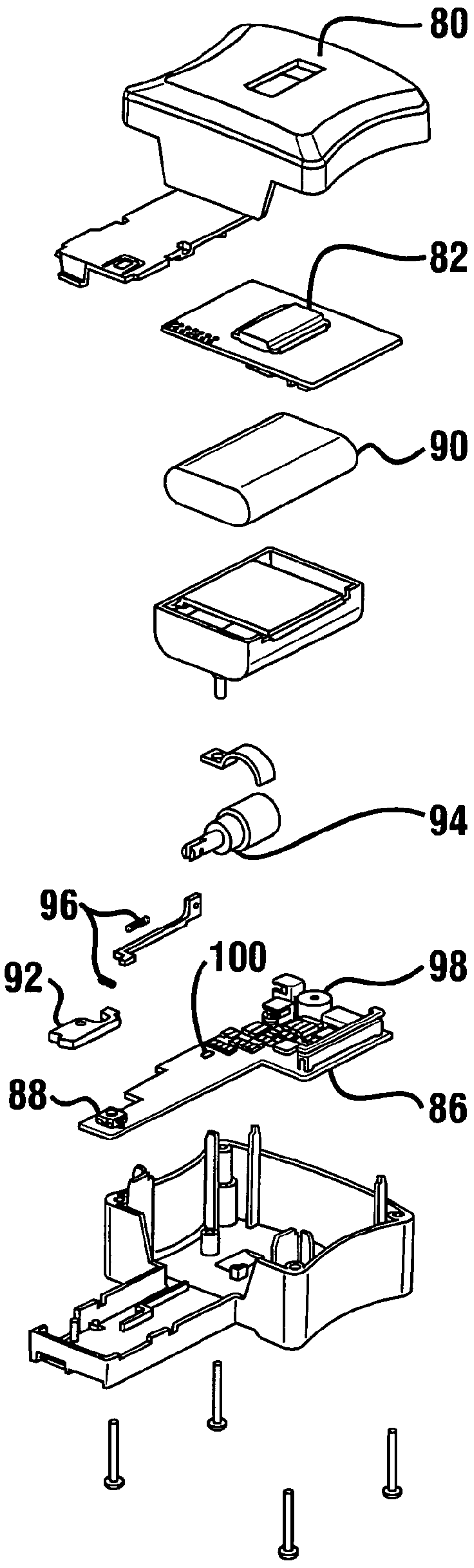
FIG. 19 is an exploded view of the electronic key module.

FIG. 19 shows certain components of the exemplary electronic key module 28. The electronic key module includes internal circuitry 86. The circuitry of the exemplary embodiment includes at least one processor operatively connected with at least one data store which are not separately shown. The electronic key module further includes a reader 88. The exemplary reader 88 is operative to read signals from RFID indicators that are included in the body 32 of each assembly. The reader 88 is in operative connection with the at least one processor.

The electronic key module further includes a rechargeable battery 90 which is operative to provide a suitable source of power to the circuitry including the processor, reader and the display.

The exemplary electronic key module further includes a movable portion 92. The movable portion 92 is in operative connection with an actuator 94. The actuator 94 is operative to change the position of the movable portion so that it extends outward in an actuating position from the extending portion. In the exemplary embodiment springs 96 operate to bias the movable portion to maintain the movable portion in a retracted position within the extending portion of the module. However, at appropriate times as the extending portion engages a body within the opening, the at least one processor is operative responsive to data read by the reader, to cause the movable portion to move so as to engage the bolt 56. As a result the extending portion operates to change the condition of the cover lock from a latched condition in which the body is held in overlying relation of the customer key opening, to an unlatched condition in which the body can be moved relative to the base and the customer key lock opening may be accessed by inserting a key therein. Of course it should be understood that this approach is exemplary.

The exemplary form of the electronic key module further includes an audio output device 98. The audio output device may operative in a manner like that subsequently discussed herein. In the exemplary embodiment the audio output device is operative to indicate that the electronic key module is operative to change the condition of the cover lock. The audio output device may also indicate that the electronic key module is not inserted in an assembly that it is programmed to unlatch. Alternatively in some embodiments the audio output device may be operative to indicate when the electronic key module has been taken out of its authorized area of operation. Of course these functions are exemplary.

Further in the exemplary embodiment circuitry 86 may also include a plurality of sensors, such as represented by sensor 100. Such sensors may include contact sensors, level sensors, inductance sensors or other suitable sensors that provide information that is usable by the at least one processor in the electronic key module. In the exemplary embodiment the sensors include at least one orientation sensor that is operative to sense the orientation of the key module relative to vertical. Such sensors may be operative to provide information to the at least one processor which causes the processor to output indicia through a display. For example the at least one processor may operate responsive to program data stored in the at least one data store, to cause the output of messages to a user to indicate that they have the key module in a proper (or improper) orientation. Such messages may be helpful in facilitating the user's operation of the system. Of course these approaches are exemplary and in other embodiments other approaches may be used.

FIGS. 20 through 25 show an exemplary embodiment of a docking station 102. Docking station 102 of the exemplary embodiment, is operative to hold electronic key modules when they are not being used by a customer. The exemplary docking station 102 may also be used for purposes of charging the internal batteries of the electronic key modules. The exemplary docking station further includes mating connectors for engaging connectors on the electronic key module. The connectors may be used for communicating data with the electronic key modules as well as for programming the data stores included therein.

Figure 20:
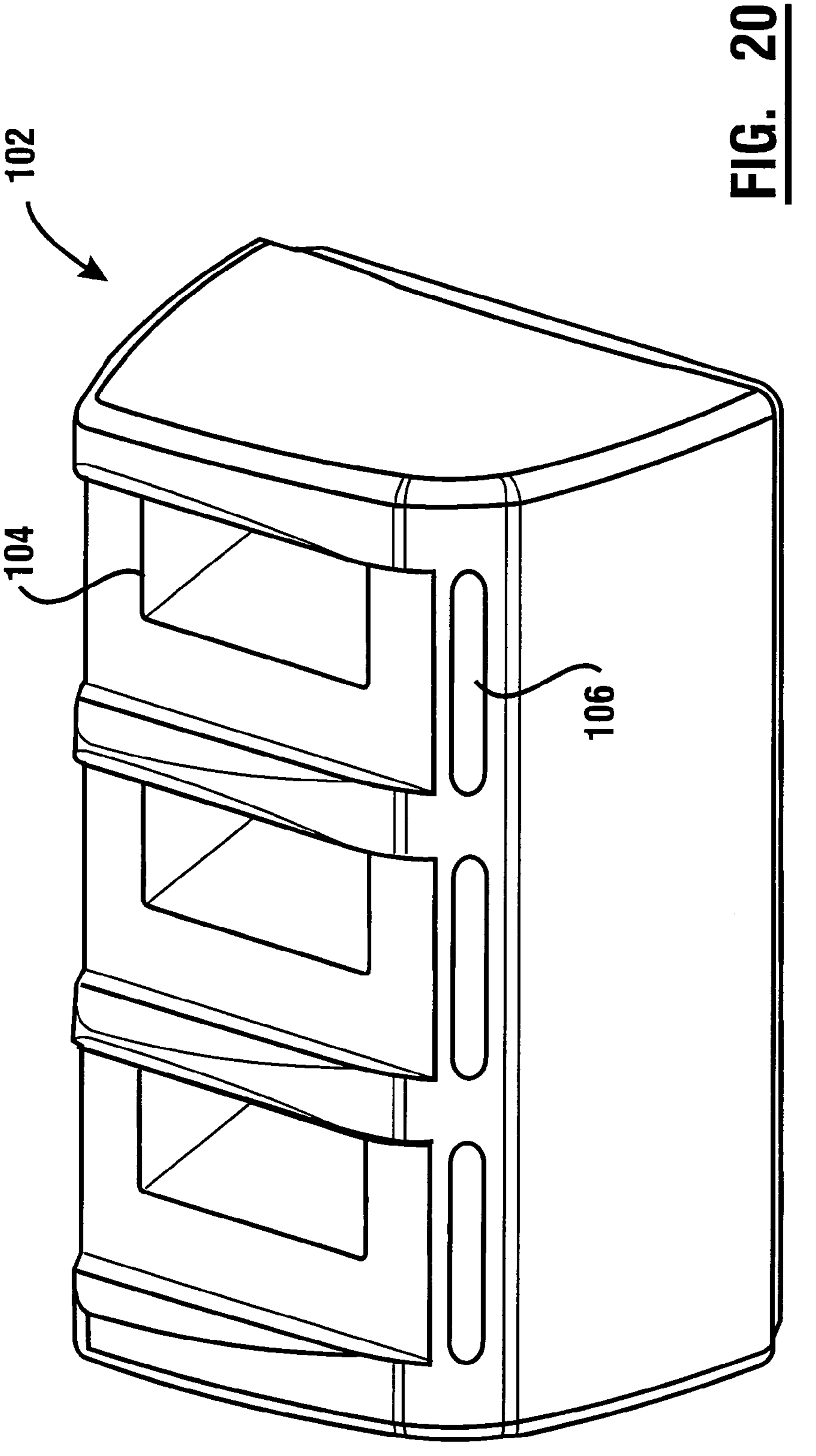
FIG. 20 is an isometric view of an exemplary docking station for electronic key modules.
Figure 21:
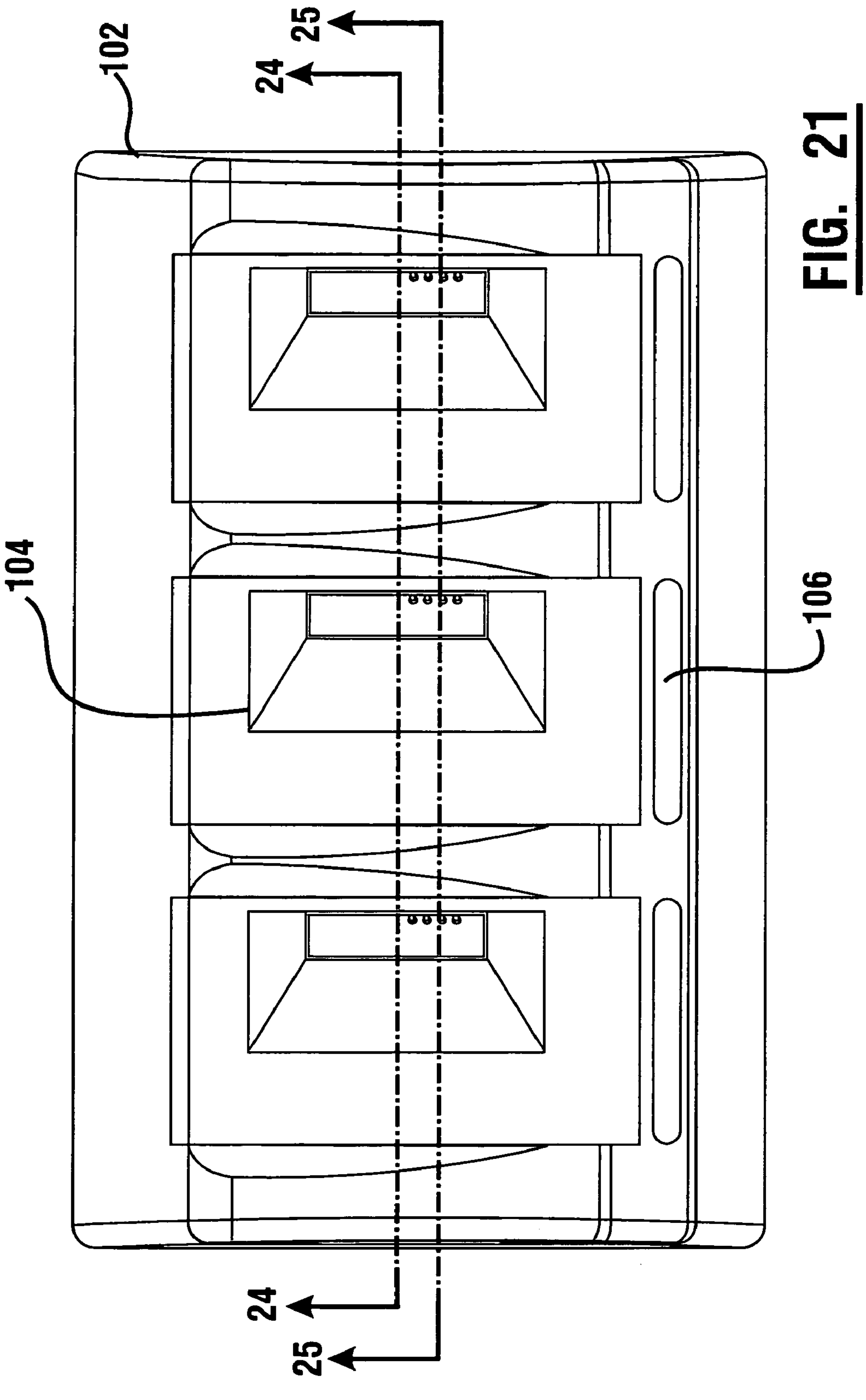
FIG. 21 is a top view of an exemplary docking station.
Figure 22:
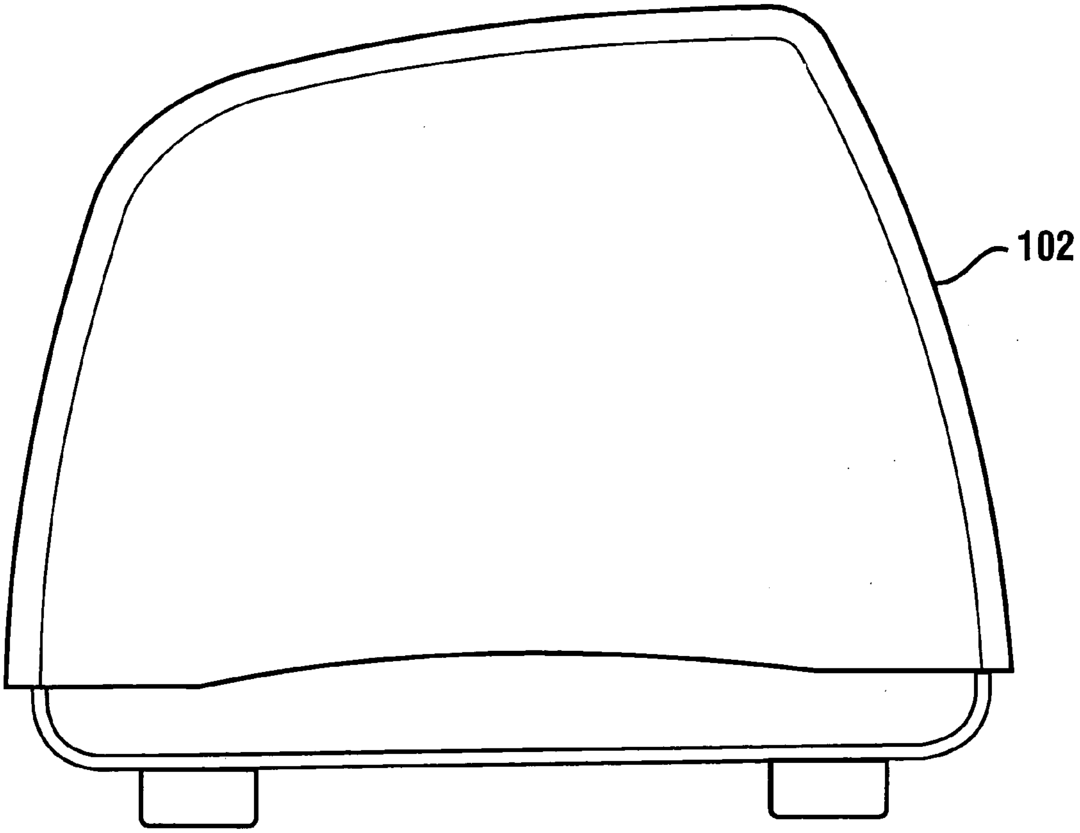
FIG. 22 is a side view of the exemplary docking station.
Figure 23:
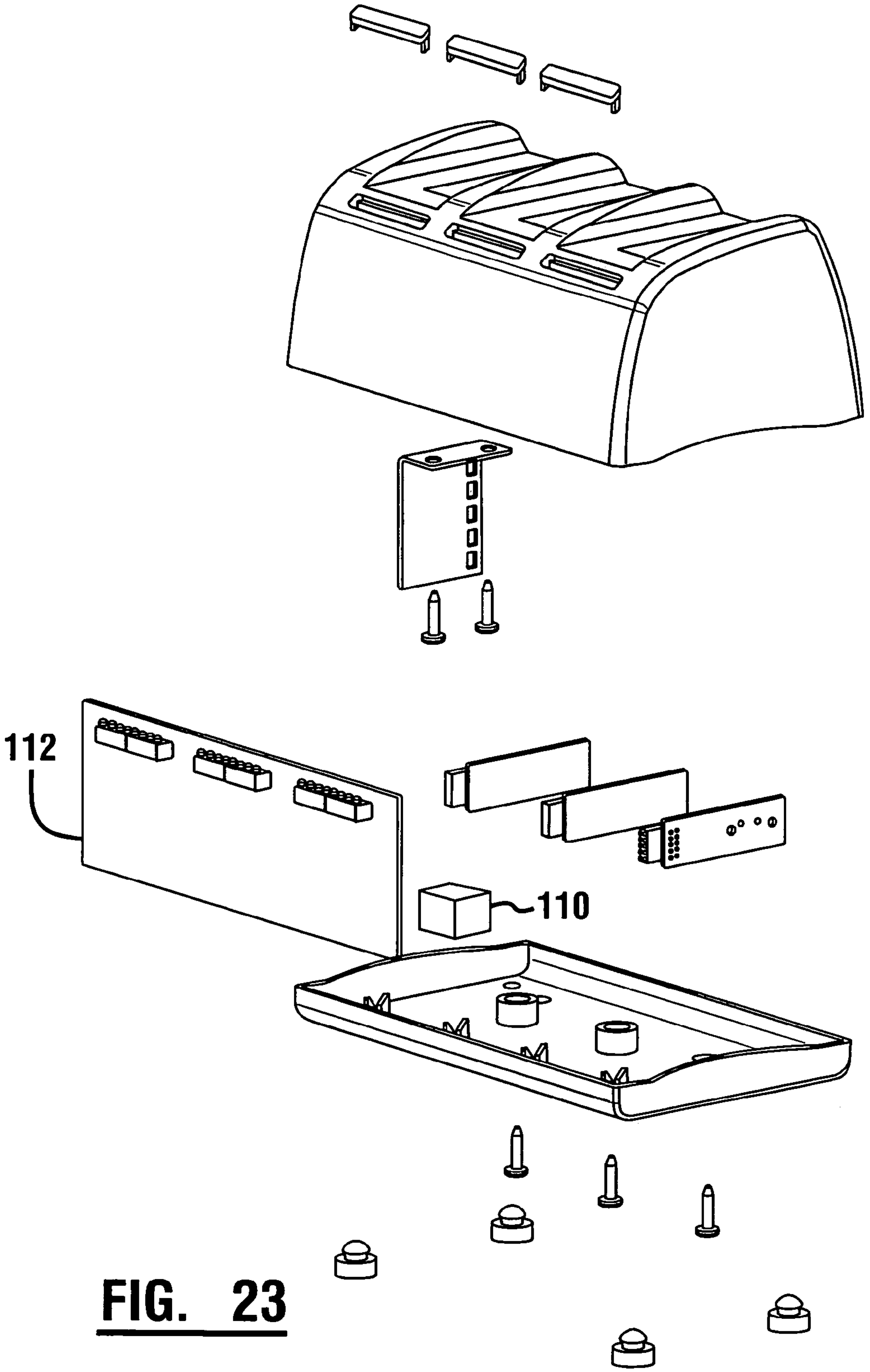
FIG. 23 is an exploded view of the exemplary docking station.
Figure 24:
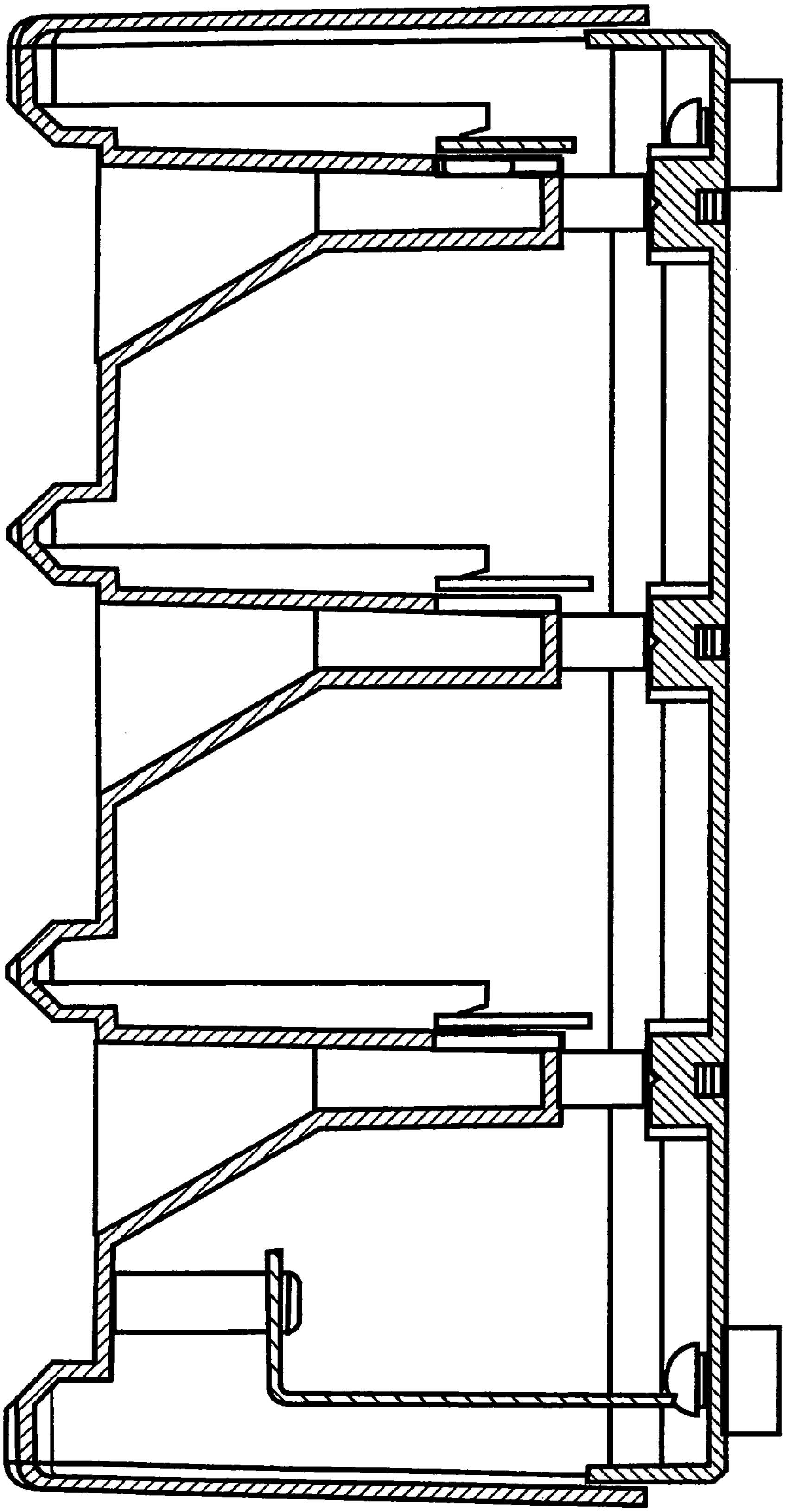
FIG. 24 is a sectional view taken along line 24-24 in FIG. 21.
Figure 25:
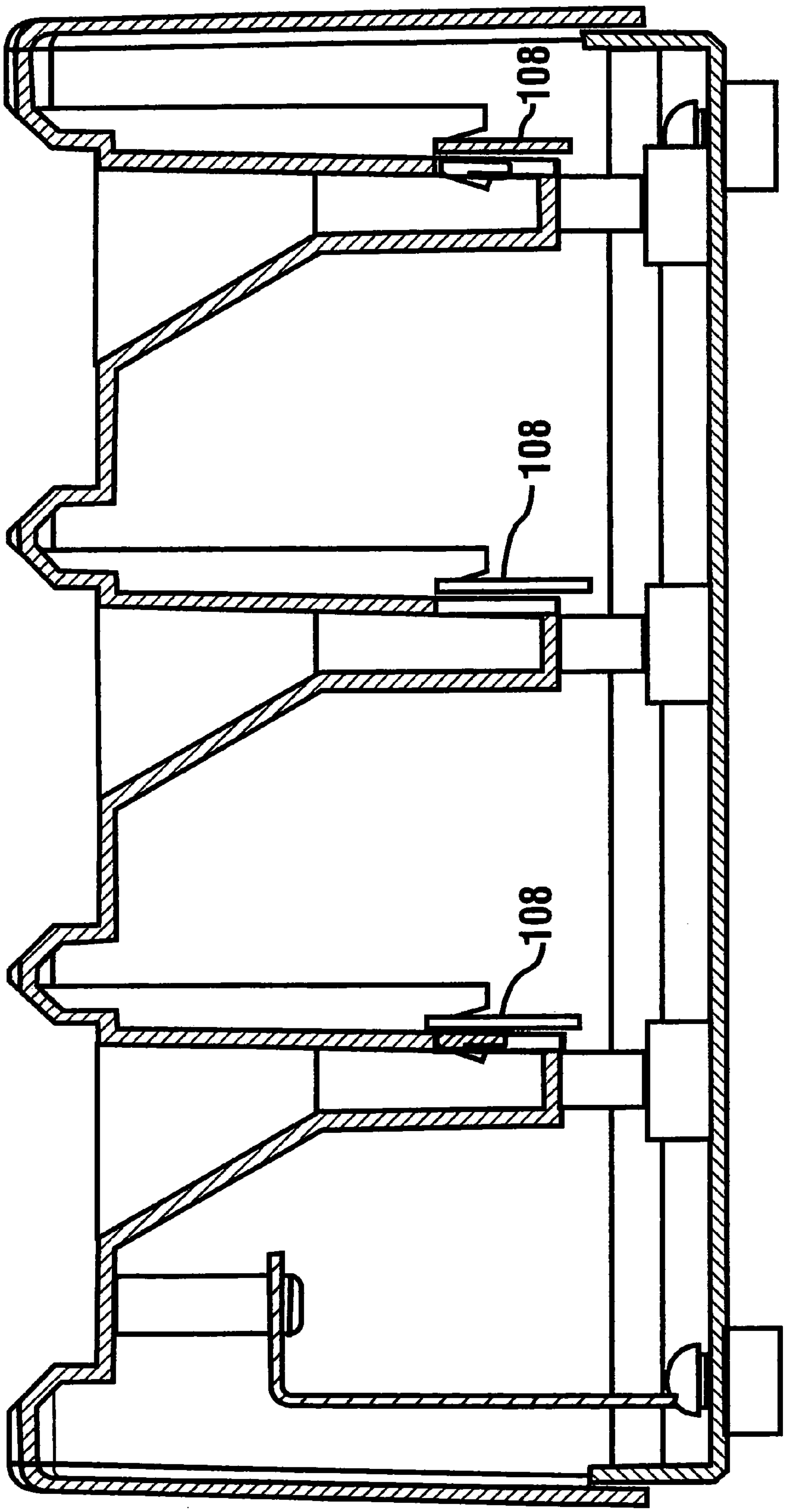
FIG. 25 is a sectional view taken along line 25-25 in FIG. 21.

As shown in FIG. 20 the exemplary docking station 102 includes a plurality of recesses 104 therein. Each of the recesses is operative to receive the extending portion of an electronic key module therein. Each recess 104 of the exemplary embodiment is associated with a visual indicator 106. The visual indicators may be used to indicate the particular electronic key module to be taken by a user. In the exemplary embodiment the docking station includes a plurality of mating connectors 108. Each of the mating connectors includes a plurality of contacts which are operative to electrically engage connectors 84 of the electronic key modules when the module is placed in engagement with the docking station. In other embodiments wireless connectors, such as RF or infrared (IR) interfaces may be used to provide communication with the modules. The exemplary embodiment of the docking station further includes a battery charger schematically indicated 110. Battery charger 110 is in operative connection with a source of power such as household current. The battery charger is operative to apply an appropriate level of voltage to the mating connectors so as to charge the batteries in the electronic key modules to an appropriate level. In addition the exemplary docking station includes circuitry 112 to carry out the appropriate charging and communication functions that are carried out through the docking station. Of course it should be understood that this structure is exemplary and in other embodiments other approaches may be used.

In the configuration of the systems of the exemplary embodiment, each body 32 has included thereon a corresponding wireless indicator schematically indicated 114 in FIG. 3. As previously discussed the wireless indicators of the exemplary embodiment include an RFID indicator. The RFID indicator associated with a particular safety deposit box is operative to output signals which correspond and uniquely identify that particular safety deposit box with regard to the plurality of other safety deposit boxes that may be installed in the particular facility. It should be understood that in some exemplary embodiments the RFID indicators may include RFID tags which are operative to output signals of a particular value based on radio frequency back scatter principles and which outputs are fixed in the production of the tag.

In alternative embodiments the RFID indicators may include programmable RFID or other programmably changeable indicators. Such programmable indicators may be programmed to output distinctive signals responsive to initial programming that is carried out either before or after the indicators have been installed on the corresponding safety deposit boxes. This may be done through a suitable programming device which is operatively engageable with the indicators. In some embodiments the electronic key module may be operative to operatively engage the wireless indicators and to carry out such programming functions.

Of course it should also be understood that in other embodiments other forms of indicators may be used to identify the particular safety deposit box. These indicators may include various types of wireless or contact type indicators. The nature of the indicators, however, in embodiments would be operative to indicate the identity of a particular safety deposit box such that access to the customer key opening on such box are restricted to an authorized user.

In operation of a system including features of the exemplary embodiment, each of a plurality of safety deposit boxes is fitted with an assembly 26 of the type previously described. Such assemblies may be fitted on the safety deposit boxes by attaching the base to the door through the use of an adhesive or other suitable permanent fastening mechanism. For each door a bent key or other suitable device for holding the guard lock in an open condition is installed in the guard lock opening. A shroud is then installed over each bent key or other device.

The body of each assembly has included therein a wireless indicator which is operative to provide signals which correspond to the identity of the particular respective safety deposit box. The programming of the wireless indicators of the exemplary embodiment enables the respective cover lock to change between the latched and unlatched conditions responsive to insertion of an appropriately programmed electronic key module in the opening of the body.

It should be appreciated that the exemplary embodiment can be used in connection with existing safety deposit boxes. Because the assemblies are installed externally of the box door, the financial institution can install the system without having to open the safety deposit boxes. As a result, the system can be installed without contacting the current users of the safety deposit boxes or requiring them to come to the bank and open their safety deposit boxes. Instead the system may be installed by the bank without any disruption or contact with the safety deposit box users. When a user next visits the bank they will be able to use the system and adapt from the prior approach which may have involved being escorted by bank personnel, and to access their safety deposit box on a self-service basis.

Figure 28:
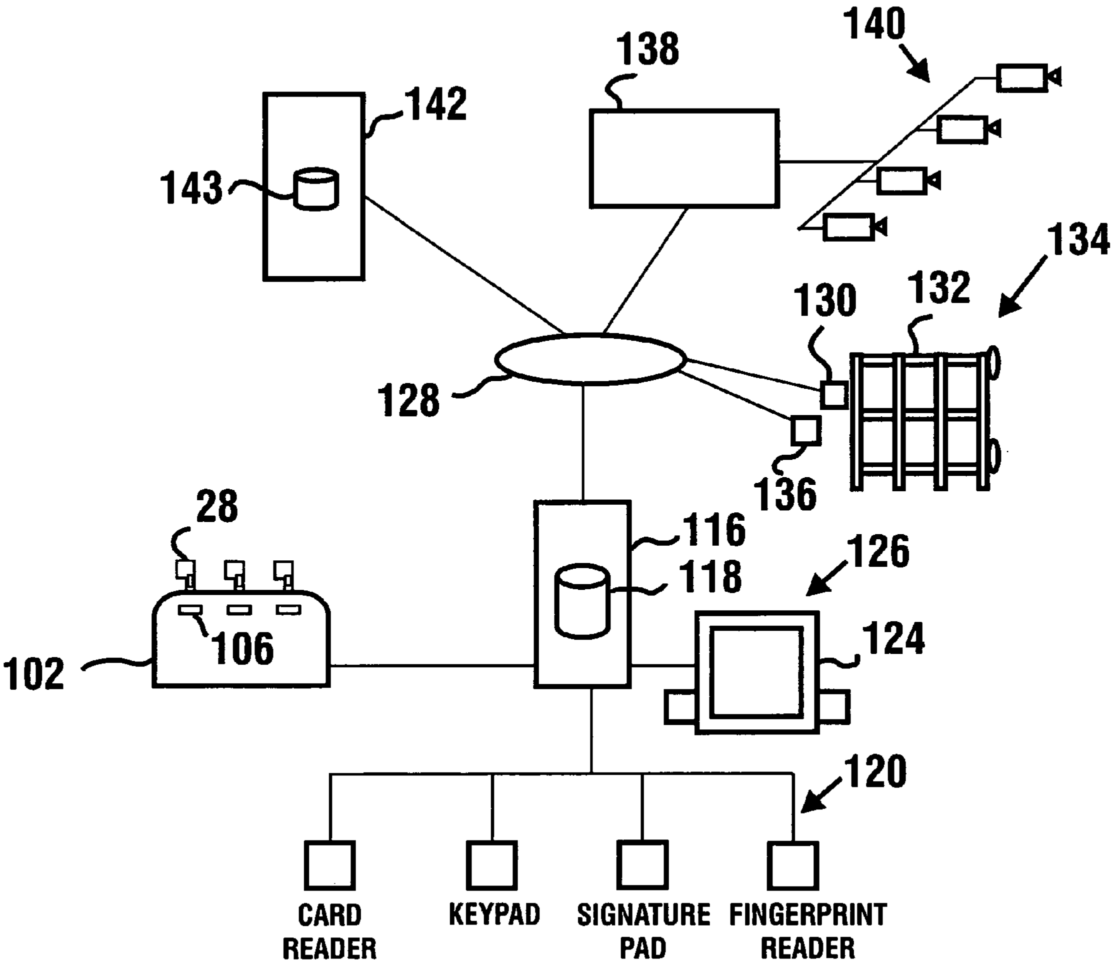
FIG. 28 is a schematic view of a system for controlling access to safety deposit boxes.

The operation of the exemplary embodiment is now further described with reference to a system which is schematically shown in FIG. 28. The exemplary system includes a computer 116 which includes at least one data store schematically indicated 118. It should be understood that although only one computer and data store are shown, embodiments may include multiple computers and data stores which are in operative connection.

In the exemplary embodiment the setup of a system involves including in the at least one data store 118, data corresponding to persons who have rented safety deposit boxes, corresponding safety deposit box information and data corresponding to the wireless indicators installed or programmed on each respective safety deposit box. The setup of the exemplary system also includes storing in the at least one data store for each respective user, identifying information which uniquely identifies the respective user. This may include for example, storing data which is encoded on the customer's debit card which is used by the customer for accessing accounts with the bank. The data stored for the respective customer may also include a secret number such as a personal identification number (PIN). This secret number may be the number that the customer uses in connection with their debit card, to debit their account for purchases of goods or to get cash from an automated banking machine, or may be a secret number or set of alphanumeric characters selected by the customer solely for banking purposes such as online banking activities. Of course this approach is exemplary. Customer identifying data in exemplary embodiments may also or alternatively include other data such as the customer's social security number, the customer's mother's maiden name, digits of the customer's phone number or other data which can be generally uniquely associated with the customer. Alternatively or in addition, customer identifying data may include the signature of the customer and/or customer biometric data. Such biometric data may include fingerprint data, iris scan data, retina scan data, facial appearance data or other data that can be used through operation of a computer to identify the customer. Of course as can be appreciated, other items of data may be used as well as combinations of certain items of data, for identification purposes.

Figure 26:
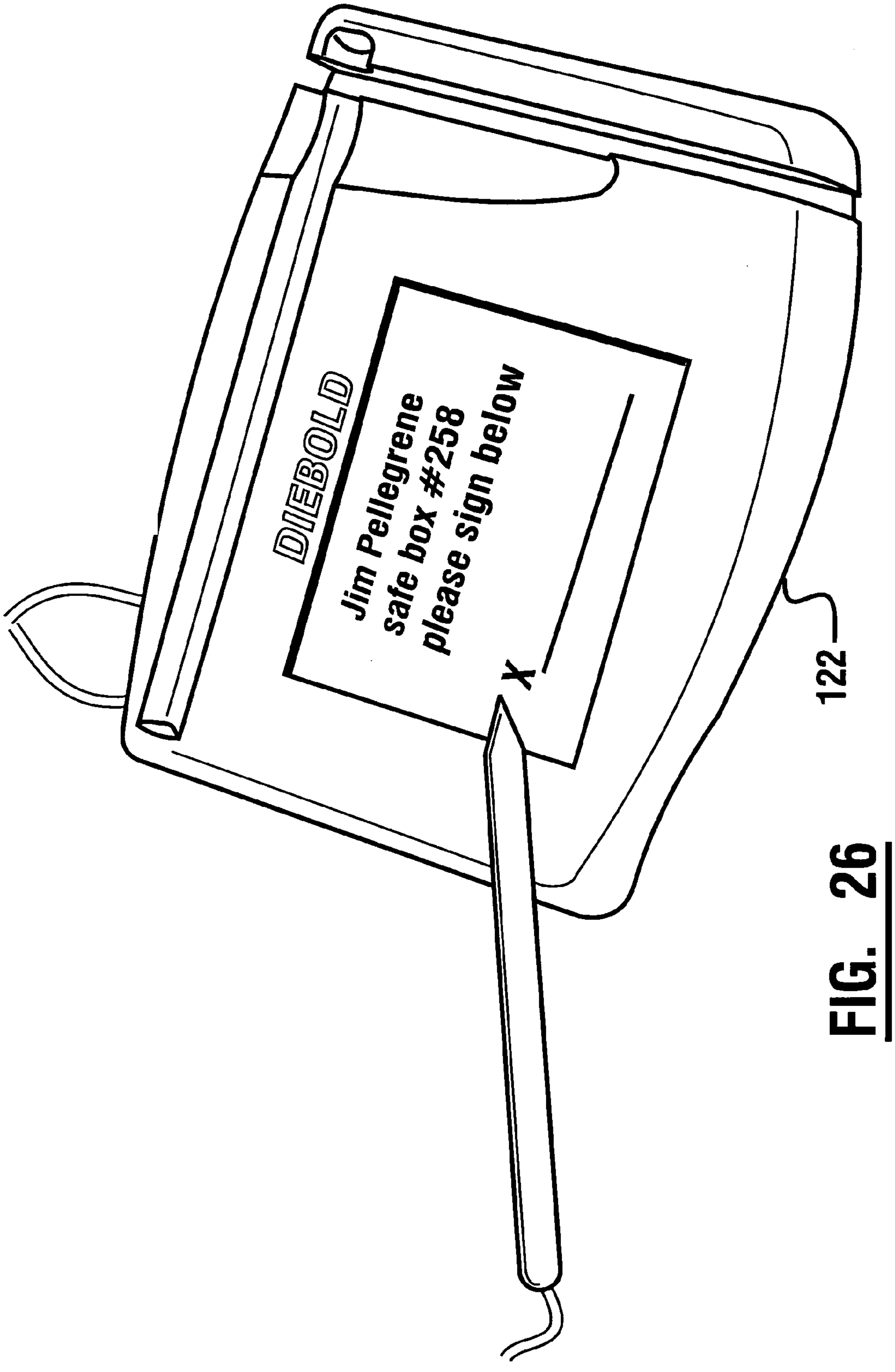
FIG. 26 is an isometric view of an exemplary customer input device used in connection with a customer terminal.
Figure 27:
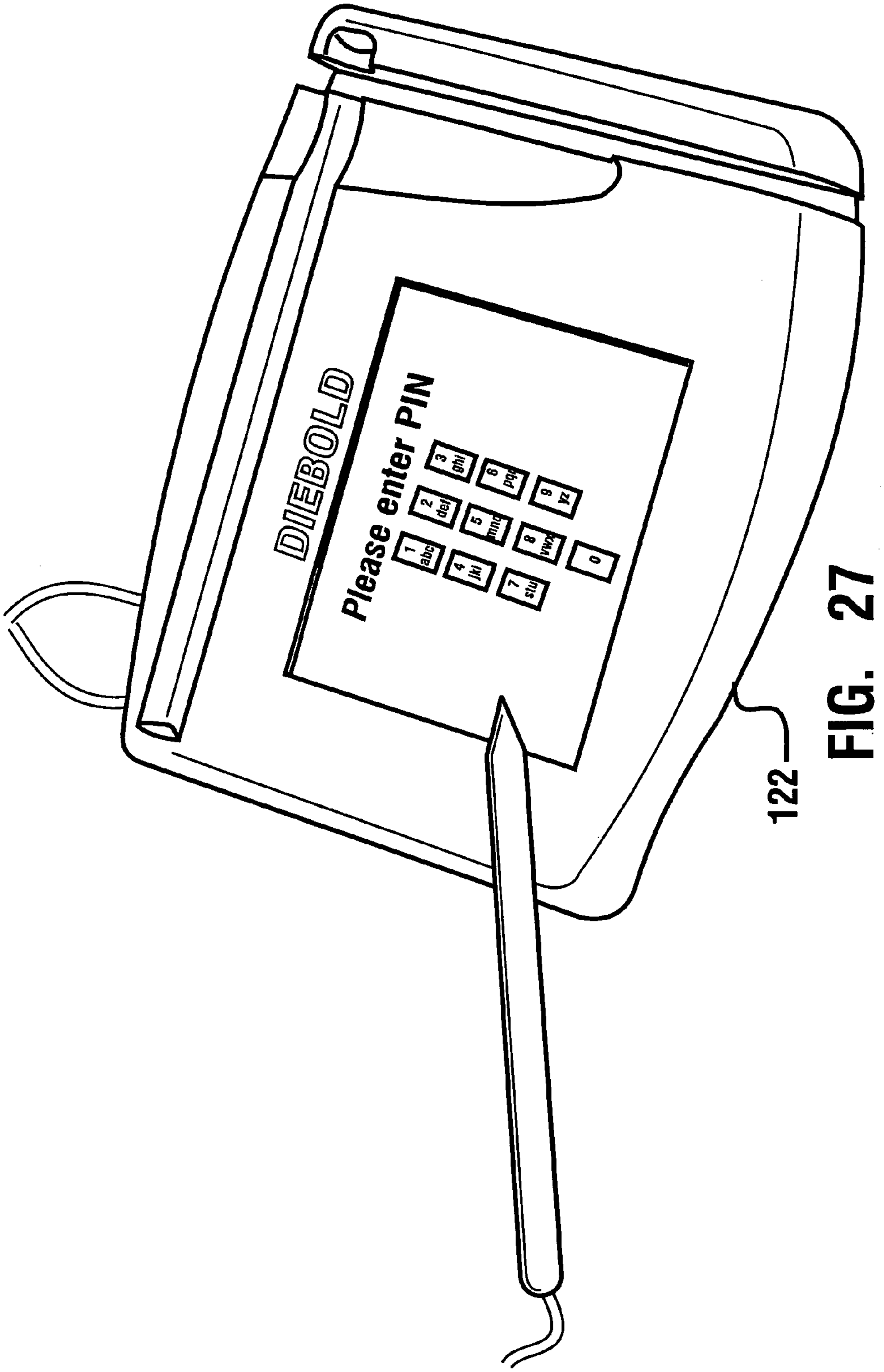
FIG. 27 is a view similar to FIG. 26 with the input device in an operative condition to receive an alternative type of customer input.

In the exemplary embodiment input devices 120 are used to receive data from the customer that is usable to identify the particular customer. As shown in FIG. 28, the exemplary input devices may include a card reader, a keypad, a signature pad, a fingerprint reader or other devices. Further it should be understood that although in FIG. 28 such devices are schematically represented as separate devices, in some embodiments such devices may be combined. For example FIGS. 26 and 27 show a device 122. Device 122 includes a stylus and contact sensitive output screen which enables the device to be used as a signature capture pad, keypad or other type of user input device. Further device 122 includes a card slot which may be suitable for reading a user's debit card or other device. Of course it should be understood that device 122 is exemplary and in other embodiments other devices may be used.

As shown in FIG. 28, computer 116 is in operative connection with an output device such as a display schematically indicated 124. Display 124 is operative to provide instructions to users for purposes of providing inputs and operating the system. As can be appreciated the combination of computer 116, input devices 120 and output device 124 may be considered to comprise an exemplary customer terminal 126 at which customers can identify themselves and receive instructions on the operation of the system.

Further as shown in the exemplary embodiment, computer 116 is in operative connection with the docking station 102. This enables the computer 116 to communicate with the electronic key modules that are engaged with the docking station. The computer is enabled to selectively program the data stores in the electronic key modules. In addition the communications between the docking stations and the computer enables the electronic key modules to download information that is stored in their respective data stores to the computer. This may include information of the type previously discussed. Such information may include for example, a time that a particular safety deposit box assembly is accessed and/or a time period that the safety deposit box door was accessible. Alternatively or in addition the data may include safety deposit boxes that were attempted to be accessed unsuccessfully by the electronic key module. Other information may include data related to the time period between when the electronic key module was disengaged from the safety deposit box, and when it was returned to the docking station. Of course other embodiments may include other data which is stored and retrieved from electronic key modules.

The at least one computer of the exemplary customer terminal 126 is in operative connection with one or more networks schematically indicated 128. In the exemplary embodiment the network is a local area network within the bank or other entity which operates the system. Of course it should be understood that in other embodiments wide area networks or other types of network connections may be used.

Connected in the exemplary network is a gate lock 130. Gate lock 130 is operative to control the locked or unlocked condition of a gate 132. Gate 132 in the exemplary embodiment comprises a day gate used to control access to a vault 134 when the main vault door is open. As previously discussed, some embodiments may also include an input device 136. The input device 136 may be actuated by customers in order to unlock the day gate. Input device 136 may operate in some embodiments in response to the electronic key module. Other embodiments may operate in response to card, PIN, biometric or other inputs provided by the user that are operative to enable the system to verify that the person unlocking the day gate is an authorized user. Of course these approaches are exemplary and in other embodiments other approaches may be used.

In the exemplary embodiment the network 128 is also in operative connection with a computer 138. Computer 138 operates as a digital video recording device. In the exemplary embodiment the computer 138 is in operative connection with a plurality of cameras 140. In an exemplary embodiment computer 138 may operate in a manner described in U.S. Pat. No. 6,583,813 the disclosure of which is incorporated herein by reference.

In the exemplary embodiment, the computer 138 may be programmed in the manner of the incorporated disclosure to operate each of the plurality of cameras as part of programmed sequences. This may include for example capturing images from cameras having a field of view that includes users operating the customer terminal 126. Alternatively or in addition the computer may operate to cause the capture of images of individuals opening the gate and/or closing the gate. Embodiments may provide for the capture of images of the user in the vault accessing the safety deposit boxes. In some embodiments the electronic key modules may include cameras. Data corresponding to images captured by the camera may be stored in the data store of the module, and then uploaded to the computer 138 when the module is engaged with the docking station. Of course capturing images in these circumstances are exemplary, and in other embodiments other approaches may be used.

In some exemplary embodiments the electronic key module may include one or more wireless output devices. Such wireless output devices may provide signals which are operative to cause images to be captured from separate cameras. Such an output device may include an RF signal transmitter, for example. Such signals may include for example, signals which are indicative of the electronic key module having been operated to open an assembly. In other embodiments the electronic key module may provide an output to indicate that the module has been used to attempt to open an assembly which it is not currently programmed to open. In still other embodiments the electronic key module may provide a position signal which causes the computer 138 to operate to capture images from cameras in the locale of the key module wherever it moves throughout the bank or other institution. In still other embodiments the electronic key module may include an alarm button or other input device which the user can actuate. The alarm button may be used to send a wireless signal which causes bank employees to provide assistance to the user, to sound an alarm or to take other actions. In some embodiments the alarm signal may also operate to cause the computer 138 to capture numerous images of the user, the vault area, the area of the electronic key module or other programmed areas. Of course it should be understood that these approaches are exemplary.

As represented in FIG. 28 the network 128 may also be in operative connection with one or more other computers schematically indicated 142. The computers include one or more associated data stores schematically indicated 143. In exemplary embodiments computers may operate to perform additional functions related to the system. Computers 142 may also be used to back up data or to include additional data which is also stored in the computer 116.

For example in some exemplary embodiments computers 142 may be used in conjunction with appropriate input and output devices to establish the necessary set up for new users of safety deposit boxes. For example an operator may review stored data to determine what safety deposit boxes are available for rental from the bank. The user may also provide input information related to the new user, including identifying information that can be used to identify the user at a later time when they wish to access their safety deposit box. The information may also include the term of the rental, the charges, arrangements for invoicing the user, and other information that is appropriate. The information established through the operation of computer 142 may be downloaded through the network to the database 118 in the customer station 126.

In still other embodiments one or more computers operatively connected to computer 142 may be operative to invoice safety deposit box users for use of their box. This may include for example causing the generation of a periodic invoice to the user which the user is required to pay to maintain their safety deposit box. Further the at least one computer may be used in conjunction with other devices to track the receipt of payments by the user for their safety deposit box. Further if the user has failed to make payment under their rental agreement for the box, the at least one computer may operate in accordance with its programming to generate the appropriate notices to the user that their box is going to be accessed, the contents removed and the box rented to another person. Further in some exemplary embodiments the at least one computer may operate to make automatic payment deductions for the rental of the safety deposit box from a selected account of a user. Of course these approaches are exemplary and in other embodiments other approaches may be used.

It should be understood that the system schematically shown in FIG. 28 is exemplary and systems which employ the principles discussed herein may include other or additional components and devices. Further it should be understood that although the exemplary embodiment has been discussed in connection with banking operations, the principles described may be applied in other environments as well.

The operation of the exemplary system with regard to a user session is now described. A user who has rented a safety deposit box and wishes to access the contents, will enter the bank or other institution operating the system. In some cases, the system including the exemplary key access assemblies may have been installed since the last time the user has accessed their safety deposit box. In this situation the user may not be familiar with the ability to operate the system and access their safety deposit box on a self-service basis. In this case, the user will approach a bank employee and inquire about accessing their safety deposit box. Such a first time user will generally be taken by the employee to the customer station and the operation of the system demonstrated to them. Further in the initial session the bank may operate the system to gather additional identifying information that the user may want to have stored in the system. This information will be used in the future for purposes of enabling the user to access their safety deposit box. Of course a user who has previously used the system will not require such attention, and may operate the system by proceeding directly to the customer terminal upon entry into the bank.

In an exemplary embodiment, for the first time user there will often be explained to the user that they can now access their safety deposit box on an unattended basis without the involvement of bank personnel. At the customer terminal the user can provide one or more inputs which cause the system to provide outputs which explain the system. In an exemplary embodiment the at least one computer 116 can provide video and audio outputs to the user that explain the operation of the system. Once a first time user has been explained the operation of the system they are asked to provide one or more inputs that will identify them to the system. This may include in exemplary embodiments, the user typing their name using a keyboard, touch screen, touchpad or other input device in operation connection with the computer 116. Alternatively such inputs may include instructing the user to swipe their ATM card in a card reader in operative connection with the computer. Alternatively or in addition, the user may be asked to input their personal identification number (PIN) through an input device.

In still other embodiments the user may be requested to provide additional inputs or alternative inputs. These may include for example input of the customer's mother's maiden name, the last four digits of their phone number or other inputs. If the bank has previously captured a thumbprint or fingerprint scan of the user, the user may be requested to provide such an input by placing their thumb or finger on a scanning device. In still other embodiments the user may be requested to place their customer key onto a scanning device. The computer may operate to scan the customer key and determine information concerning the user based on the configuration of the key that can be used to open the safety deposit box. In still other embodiments the customer may include speech recognition software that enables the computer to receive and recognize verbal inputs. Of course these approaches are exemplary.

In some embodiments the programming associated with the computer 116 may operate to capture additional inputs from the user when the user operates the system for the first time. These inputs may be used in the future to identify the authorized user. These may include additional numbers, values, biometric data or other information. The computer in the future would then ask the user to input these items through at least one input device in order to access their safety deposit box.

Once the user has identified themself at the customer terminal 126, the computer 116 is operative to determine the safety deposit box associated with the user. The computer also determines the data associated with the wireless indicator that has been applied to the assembly on the door of that box. The computer is operative to program one of the electronic key modules 28 in the docking station 102 with the data that is necessary to cause that electronic key module to open the cover lock of that particular assembly.

In exemplary embodiments the at least one computer 116 will also be operative to store information about the user's request and the fact that they have initiated a session, as well as the time and date thereof. Other pertinent information may also be stored through operation of the at least one computer. Of course these approaches are exemplary.

After the computer 116 has operated to cause the at least one data store in the electronic key module to be programmed with the appropriate data, at least one output is provided to the user through the display 124 or other output device of the customer terminal instructing the user to remove the appropriate electronic key module from the docking station. The computer may also cause the indicator 106 associated with the appropriately programmed electronic key module to change color, flash or otherwise indicate the electronic key module that the user is supposed to take. The user is also instructed through outputs from the customer terminal to proceed to the day gate.

In some exemplary embodiments the at least one computer 116 is operative to sense the taking of the electronic key module from the docking station. Responsive to sensing the taking of the electronic key module the at least one computer is operative to change the condition of the gate lock 130 from the locked to the unlocked condition. This enables the user to open the gate 132 and enter the vault.

In other embodiments the system may operate to require the user to provide an appropriate input through input device 136 adjacent to the gate to open the gate. This may include insertion of the electronic key module into an appropriate opening in a device. Alternatively it may include requiring the user to input a card, input a PIN, provide a thumbprint, provide a verbal input, or otherwise provide another input that the computer 116 can verify is associated with the authorized user. Such an input upon being verified through operation of the computer, causes the gate lock to change to the unlocked condition. Of course it should be understood that this approach is exemplary.

Also in the exemplary embodiments as previously discussed, the activities carried out by the computer, the day gate, the electronic key module or other components of the system may provide triggering events which are operative to cause the computer 138 to cause the capture of images from one or more cameras that have a field of view that includes of activities that are ongoing in the course of the transaction.

In the exemplary embodiment once the user has entered the vault they may proceed to their safety deposit box. In some embodiments the electronic key module may facilitate finding their box by providing one or more outputs through the display which correspond to the identifying indicia on the body which overlies the key openings. In some exemplary embodiments the output is provided in an orientation which corresponds to the indicia on the box. As can be appreciated, in the exemplary embodiment the extending portion of the electronic key module can be inserted into openings in either a left-hand or right-hand orientation. The programming of the at least one processor of the exemplary embodiment is operative to cause the display to output the visual indicia in an orientation that corresponds to that presented on the safety deposit box. Further in exemplary embodiments the at least one sensor that senses the orientation of the electronic key module is in operative connection with the at least one processor and causes the processor to output through the display instructions to the user which may facilitate the user's use of the electronic key module. For example if the user has the electronic key module in an improper orientation for purposes of insertion into the corresponding opening, the at least one processor is operative to cause the display to output instructions, arrows or other indicia. This directs the user to place the electronic key module in the proper orientation.

In still other embodiments the at least one sensor may operate to cause the display of the electronic key module to reverse the orientation of the indicia being output based on the current orientation of the electronic key module.

In still other embodiments the at least one processor of the electronic key module may cause the audio output device to provide outputs which facilitate the use of the electronic key module. These may include for example simulated speech outputs. These simulated speech outputs may be used to help the user locate their safety deposit box and to insert the extending portion into the assembly. Such simulated speech outputs may include not only directions on how to insert the extending portion of the electronic key module, but may also include instructions on locating the user's box. This may include for example directions on where the box is located within the array of safety deposit boxes. It may also indicate other identifying features associated with the safety deposit box.

In still other embodiments additional provisions may be made for guiding the user to the box. For example in some embodiments the at least one computer 138 may include data corresponding to positions of all of the plurality of safety deposit boxes within the vault. The at least one computer may have in operative connection with a camera or separately, a selectively movable pointing device which may be used to help guide a user to their particular safety deposit box. This may include for example, a laser pointing device that is mounted on a camera mount or similar device that is operative to pan and tilt the laser pointing device. Such a device may then be operative to project a laser dot or other appropriate indicator onto the specific safety deposit box which the user is to access. Such an approach may be useful in guiding the user specifically to the particular box of the user. Further in the exemplary embodiment once the user has accessed the body, the at least one computer may operate to cease pointing to the box. This may be done responsive to wireless signals output through operation of the electronic key module. Such wireless signals may be of any convenient type that can be sensed in the vault area. These may include radio signals, IR signals, other wireless signals or other suitable signals that may be output from the electronic key module.

Once the user has reached their particular safety deposit box, they extend the extending portion of the electronic key module into the associated opening. As this is done the reader 88 in conjunction with the at least one processor in the electronic key module is operative to cause output RF radiation to be applied to the wireless indicator 114 in the assembly. The reader is then operative to receive one or more signals produced by the wireless indicator. The at least one processor is operative to analyze the signals, and to make a determination that the signals that are being received by the reader correspond to the data that has been programmed in the at least one data store of the electronic key module. In some embodiments such determination may include a direct comparison of data read from the wireless indicator to data stored in the data store. In other embodiments the at least one processor may analyze the data to determine other mathematical relationships. In still other embodiments encryption and decryption of signals may be associated with making the determination. Of course these approaches are exemplary and in other embodiments other approaches may be used.

If the wireless indicator associated with the particular assembly in which the extending portion has been inserted does not correspond to the programming of the electronic key module, the cover lock of the assembly in which the key module has been inserted does not unlock. Further in an exemplary embodiment, the electronic key module is operative to output an audible output which is indicative that the electronic key module has been inserted in an incorrect assembly. This may include appropriate tones, simulated speech or other appropriate outputs. Further in the exemplary embodiment, the at least one processor is operative to record the information concerning the wireless indicator associated with the box that was attempted to be opened. In exemplary embodiments other information may also be stored such as the time of such insertion, the duration of such insertion or other information that may be useful to the system.

As can be appreciated, in the exemplary embodiment insertion of the extending portion of the electronic key module in an assembly it is not currently programmed to open, does not change the condition of a cover lock. This is because the extending portion is enabled to pass through the leg portions 58 of the bolt 56 as well as between the projecting portions 70 of the member 64. Of course because in the exemplary embodiment the electronic key module is not effective to unlock the cover lock of an assembly for which it has not been programmed, the catch does not engage the extending portion the user is free to remove the extending portion from that assembly and attempt to open the correct assembly. Of course this approach is exemplary and in other embodiments other approaches may be used.

In an exemplary embodiment even after a user has inserted the extending portion of the electronic key module into an incorrect assembly, the user is enabled to remove the electronic key module and insert it into another assembly. Of course users will generally not have attempted to open an improper assembly before proceeding to the safety deposit box for which the unit has been programmed. However, in the exemplary embodiment if the user happens to make a mistake it will not preclude them from using the electronic key module to open the correct assembly. However, in other embodiments the at least one processor in the electronic key module may be programmed to disable further use of the module after an improper attempt is made, or another form of improper activity is determined as possibly occurring through operation of the at least one processor in the module.

In the exemplary embodiment when the user inserts the extending portion 76 into the opening 54 of the proper assembly, the reader is operative to read the signals produced by the wireless indicator 114 of the assembly. In this example the signals from the indicator correspond to data stored in the at least one data store of the electronic key module. The processor is operative to make a determination that the read data corresponds to the stored data and that the extending portion is being inserted into an assembly that should be opened.

In the exemplary embodiment the at least one processor is operative to cause the actuator 94 in the electronic key module to cause the movable portion 92 to extend outward from the extending portion 76. This occurs at a time when the extending portion is extended within the opening and the movable portion 92 is operative to engage a projection or other feature on an interior surface of bolt 56. Such engagement is operative to cause the bolt to move to the left as shown in FIG. 14. This causes corresponding movement of the tabs 60 so that they disengage from mating surfaces on the base of the assembly. This causes the cover lock to change from the latched condition to the unlatched condition.

Further, in the exemplary embodiment as the bolt 56 moves to change the condition of the lock, the member 64 pivots counterclockwise as shown in FIG. 14. This pivoting motion causes the extending surface 68 to move responsive to biasing force so that the bolt 56 is held in the unlatched condition. In addition in the exemplary embodiment, movement of the member 64 causes the projections 72 to engage a respective one of the recesses 78 on the extending portion. This causes the extending portion to be held in the opening. As a result the member 64 is part of the catch that is operative to hold the electronic key module engaged with the body portion of the assembly until the cover lock is returned to the latched position.

Of course it should be understood that the structures described are exemplary and in other embodiments other structures for the cover lock and catch may be used. These may include for example, numerous types of projections, recesses, transmitting devices, engaging devices and structures or other types of devices that cooperatively act to change a lock operatively connected to the body from a position where the body blocks access to the key opening to a condition in which the key opening can be accessed. For example some embodiments may include structures which carry out one or more lock opening actions while a key module is stationary as opposed to moving. Likewise rather than projections and recesses of the type described in the exemplary embodiment, alternative arrangements of members may be used to provide the functions of opening a lock and providing a catch that is operative to hold the assembly and an electronic key module in engaged relation. Further as can be appreciated, numerous different types of configurations of electronic key modules, locks, openings, actuators and the like may be used. These may include electronic key modules that operate without physical contact or that provide other forms of engagement from those described in connection with the exemplary embodiment. Those having skill in the art may devise numerous other embodiments that employ the principles described herein.

In the exemplary embodiment the movement of the cover lock from the latched to the unlatched condition and the engagement of the catch with the extending portion of the electronic key module, enables the body 32 to be moved relative to the base about the hinge connection associated with pins 50. Body 32 is rotated relative to the base 30 so that the key opening of the customer lock 24 is accessible through the customer key access area 48 of the base portion. As can be appreciated in the exemplary embodiment the shroud 42 of the base portion overlies the guard lock and associated bent key or other structure so that the user cannot tamper with the status of the guard lock which remains in the open position.

In the exemplary embodiment the customer is enabled to use their customer key and insert it in the customer key lock. Turning the key in the customer key lock changes the condition of lock 20 so as to retract a bolt therein that holds the door 16 of the safety deposit box in the closed condition. The retraction of the bolt enables the customer to open the door and access the interior area of the safety deposit box. Generally upon accessing the interior of the safety deposit box the user removes a container therefrom which holds the user's valuable articles. The user can then take the container and perform their activities in another area of the vault such as on a table or in a connected private room. Of course these approaches are exemplary.

It should be understood that as previously discussed, embodiments of the electronic key module may provide audible or other wireless signals at times during the box opening activity. Such signals may include an appropriate signal when the electronic key module has determined that it is engaged with the safety deposit box that it is programmed to open. Alternatively and in addition, the signals of the audible or RF type from the electronic key module may be received by a suitable receiver and cause various other actions such as the capturing of images through cameras positioned in the vault area. Likewise such signals may be used to turn off systems like those previously described, which are operative to guide the user to their particular safety deposit box. Additionally the electronic key module may operate to generate wireless signals when it is operatively disengaged from a safety deposit box it has been used to open. Exemplary electronic key modules may also output signals when they are operatively engaged with a safety deposit box that the module is not currently programmed to open. A recording device may capture one or more images in response to such signals from cameras that have a field of view that includes the module at the time such signals are output. Of course these approaches are exemplary.

Also as previously discussed, in the exemplary embodiment the at least one processor of the electronic key module is operative to cause to be recorded in the at least one data store, data corresponding to certain parameters, values and other data that the electronic key module has been programmed to record. These may include for example, the time that the electronic key module is engaged with the assembly. The electronic key module may also record an elapsed time that the electronic key module is engaged so as to maintain the body in an exposing position. Of course in other embodiments other parameters or information may be recorded depending on the programming of the system.

Figure 6:
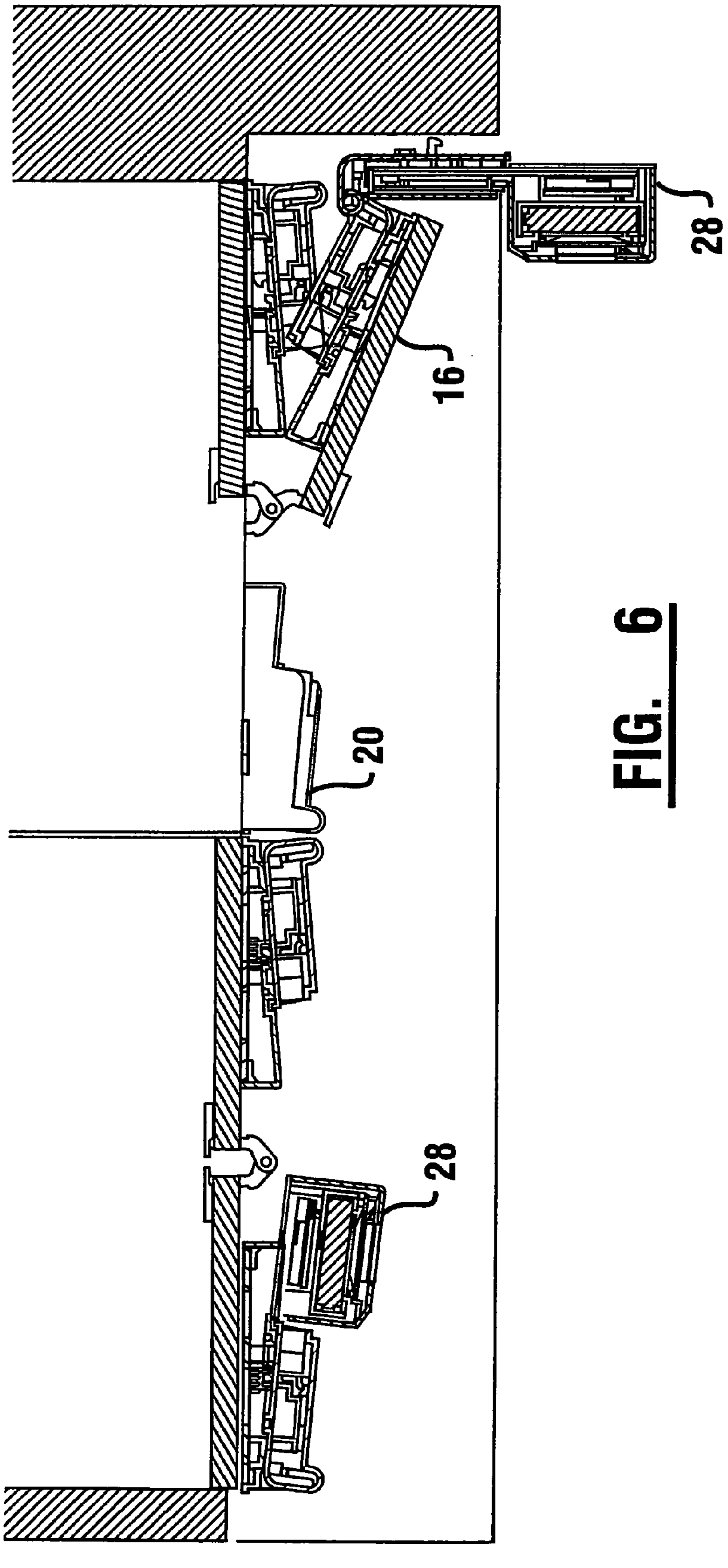
FIG. 6 is a top view showing movement of safety deposit box doors and the assemblies mounted thereon.
Figure 7:
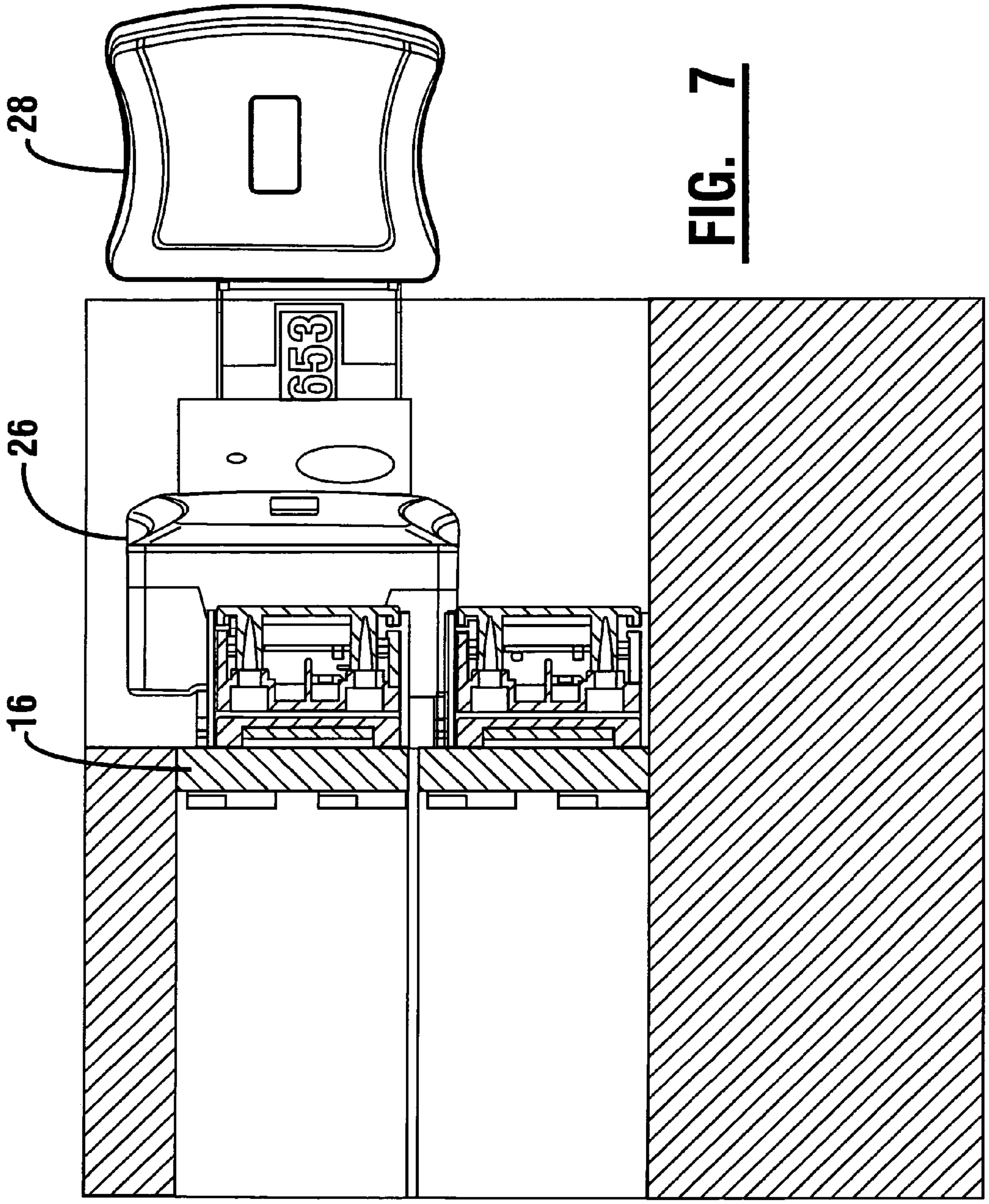
FIG. 7 is a partially sectioned side view showing a safety deposit box door and electronic key module.
Figure 8:
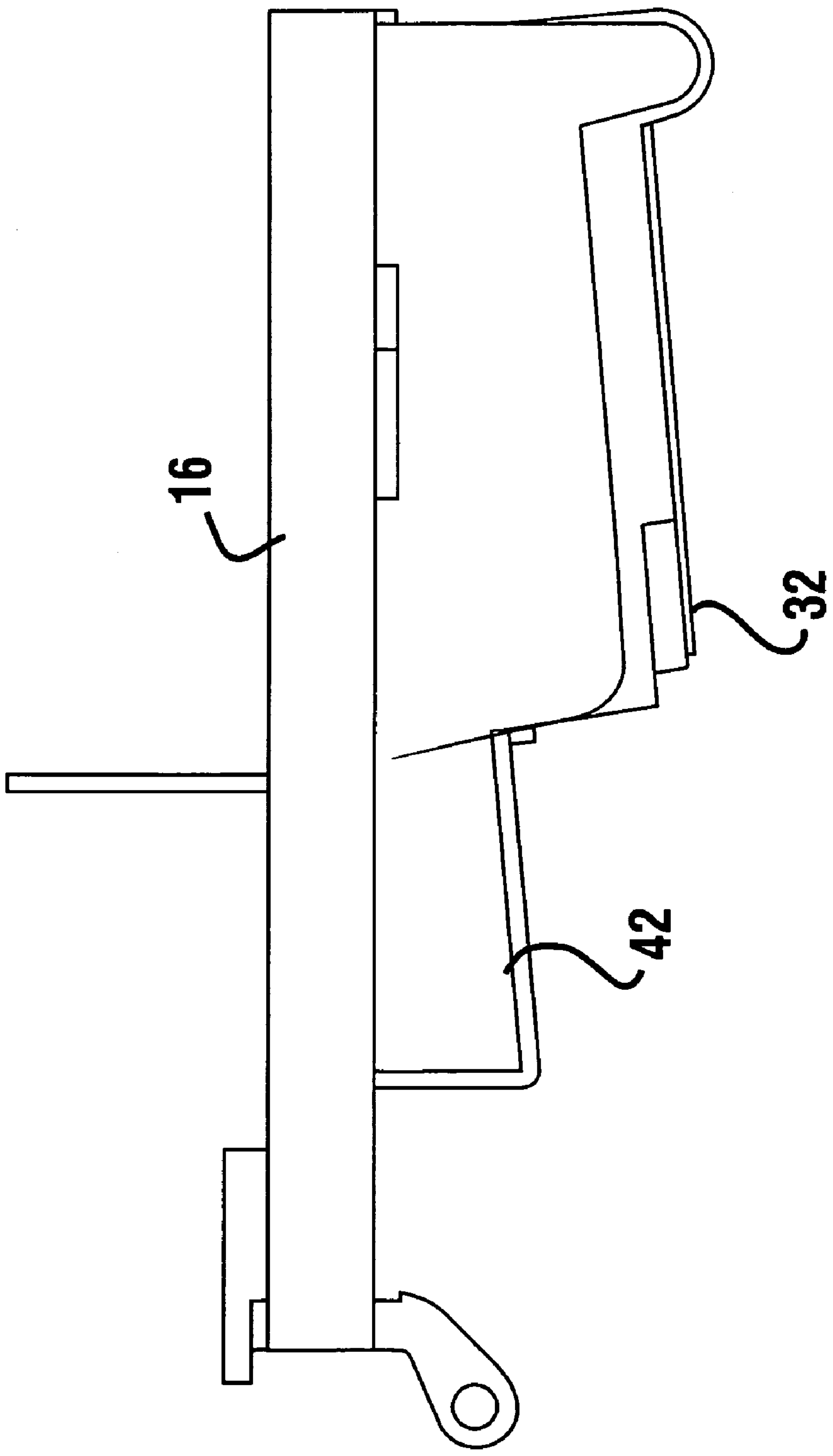
FIG. 8 is a top view of a safety deposit box door and assembly to control the access to key openings thereon.
Figure 11:
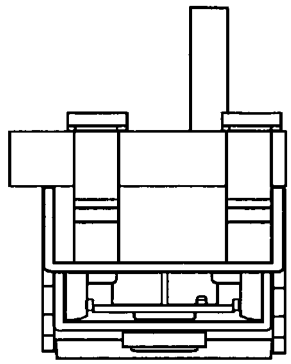
FIG. 11 is a right-hand view of the door and assembly shown in FIG. 9.
Figure 9:
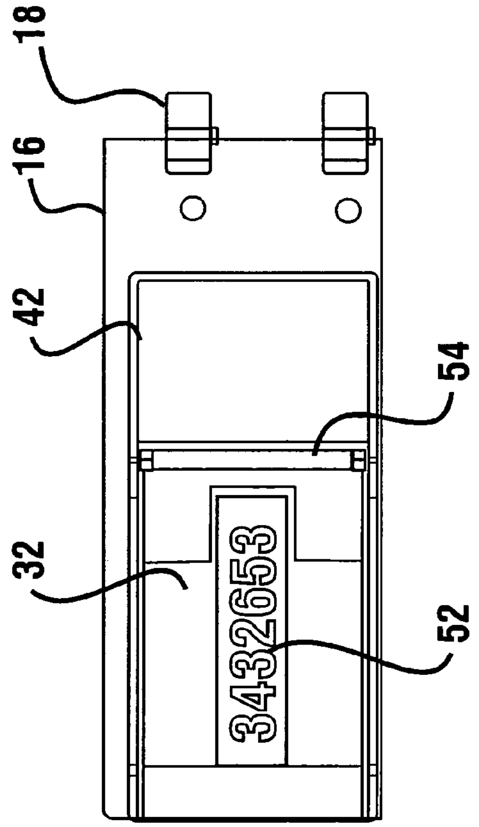
FIG. 9 is a front plan view of an exemplary safety deposit box door and assembly.
Figure 10:
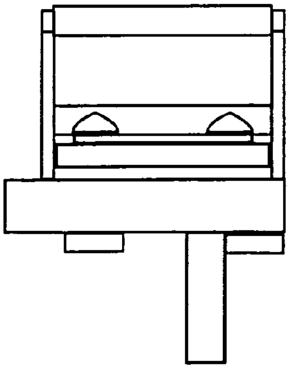
FIG. 10 is a left-hand view of the door and assembly shown in FIG. 9.
Figure 12:
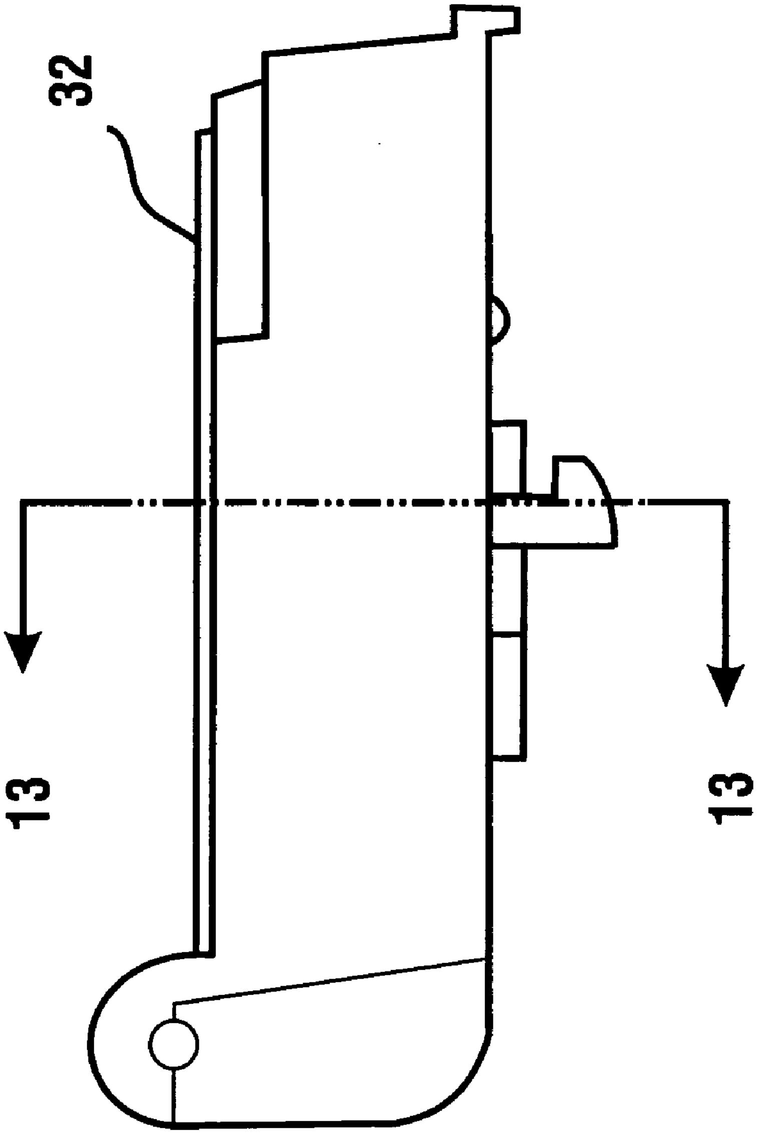
FIG. 12 is a top view of the body portion of the assembly.
Figure 13:
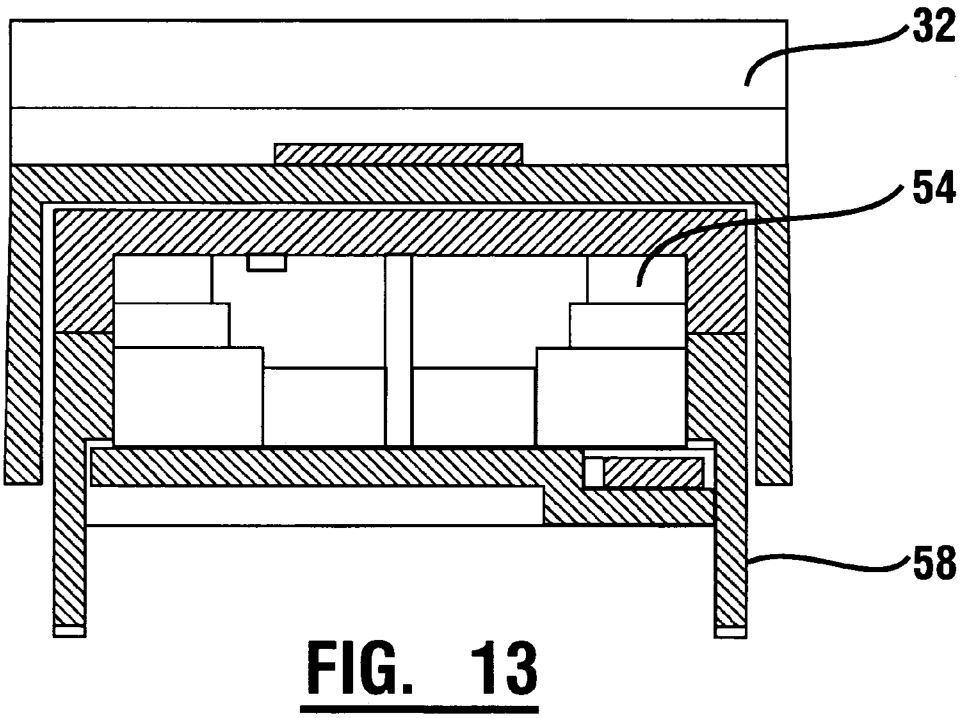
FIG. 13 is a sectional view along line 13-13 in FIG. 12.

In the exemplary embodiment the hinged nature of the body relative to the base as well as the hinged character of the safety deposit box doors, enable the electronic key module to remain engaged with the catch while not restricting access to the interior of the safety deposit box. This can be seen for example with regard to FIG. 6. As can be appreciated the ability of the body which holds the electronic key module through operation of the catch, to pivot on an opposite side of the door from the door hinges, enables the door to be sufficiently opened to gain access to the interior area. This is accomplished despite the thickness of the base of the exemplary embodiment. This ability of the body portion to pivot also accommodates the fact that the customer key remains captured in the key opening while the lock 20 is in the unlocked position. Thus the exemplary embodiment minimizes the risk of collisions and damage to the assembly when the door is open. Of course this approach is exemplary and in other embodiments other approaches may be used.

In the exemplary embodiment after the user has completed the activities related to the contents of their safety deposit box, the user returns the container to the interior area. The user may then close the door 16 and secure the door by turning the customer key in the customer key lock. This causes the bolt to extend from the lock 20 and hold the door in the closed position.

With lock 20 again in the locked condition, the customer is able to remove their key from the key opening. The customer may then move the body relative to the door from the exposing position to the blocking position in which the body overlies the customer key opening. In the exemplary embodiment as this occurs the projecting portions 70 engage the base and then move upward as shown in FIG. 14. This movement of the member 64 causes the extending surface 68 to also be disposed so as to no longer prevent the bolt 56 from moving to the right as shown in FIG. 14. As a result the bolt moves as do the connected tabs 60. The tabs engage surfaces of the base so as to hold the body in the blocking position. As a result the cover lock is returned to the latched condition.

Further in the exemplary embodiment movement of the member 64 causes the projections 72 to disengage from the recesses 78 in the extending portion 76 of the electronic key module. As a result the catch no longer holds the electronic key module engaged in the opening. The electronic key module can thereafter be removed by retracting the extending portion 76 out of the opening 54.

In some embodiments as the electronic key module is disengaged from the assembly, outputs may be provided by the module to accomplish certain functions. For example in some embodiments audio outputs may be provided to indicate to the user the disengagement of the electronic key module. Further RF or other signals may be operative to cause the computer 138 to capture images from various cameras. Additional actions may occur as a result of such disengagement depending on the configuration and operation of the particular system.

Some exemplary embodiments of the system may enable the user to open the cover lock again after it has been resecured without returning the electronic key module to the docking station. This may enable a user to reopen their safety deposit box in the event they forgot to perform some activity. Other embodiments may operate in accordance with the programming of the at least one processor in the electronic key module, to only enable the opening of the assembly once. As a result in this circumstance if a user wishes to reopen their safety deposit box, they need to complete the current session and start another. Embodiments may operate in either manner depending on the programming associated with the electronic key module. In exemplary embodiments where a subsequent opening of the cover latch is permitted during a session, the at least one processor in the module may be operative to record information concerning each such opening, as well as the time and/or duration thereof. Of course it should be understood that these approaches are exemplary.

In some embodiments the disengagement of the electronic key module from the assembly is also operative to cause the at least one processor in the electronic key module to begin determining whether the conditions are such that the electronic key module has been removed from the proper area of operation. This might occur for example, if a user forgets to return the electronic key module to the docking station. In some embodiments the at least one processor operates at least one timing function therein to determine a time period that has elapsed since the electronic key module was disengaged from the assembly. For example in some embodiments the at least one processor may begin to give audible outputs or other signals in the event that the electronic key module has not been engaged with the docking station within a particular time after being disengaged from the assembly.

In other embodiments the at least one processor of the electronic key module may operate to provide indications that it has been removed from its area of use based on other factors. For example in some embodiments a wireless signal may be provided in the area of the safety deposit boxes. The electronic key module circuitry and the processor therein is operative to receive the signal. If the electronic key module is taken from the area of operation so that the signal is no longer detected at an adequate strength, the electronic key module may provide audible or other outputs to indicate its position and that it needs to be returned to the docking station.

In still other exemplary embodiments a facility may provide signals in other areas such as near the facility exit. In such embodiments the electronic key module may operate responsive to the processor therein to cause outputs to be provided in the event a user attempts to move the electronic key module into an area adjacent to the exit of the facility. Further in still other embodiments the electronic key module itself may output signals which are detected by detectors throughout the facility. In the event the detectors in the facility and/or signals caused to be output from the electronic key module indicate that there has been a determination by the at least one processor, that the electronic key module is being removed from its area of use, appropriate signals can be given. Of course it should be understood that these approaches are exemplary.

In the course of a normal transaction of the type previously described, the user having disengaged the electronic key module from the assembly will exit the vault area through the gate. Generally the gate will not need to be separately unlocked by a user wishing to exit the vault, however an unlocking mechanism for this purpose may be provided in some embodiments. The user having exited the vault will then return the module to one of the slots in the docking station 102. The return of the electronic key module to the docking station is sensed in the operation of the at least one computer 116, and the computer then operates in accordance with its programming to communicate with the electronic key module through the connectors and mating connectors which are engaged when the module has been returned to its docking station. In exemplary embodiments this communication may include retrieving from the electronic key module information about unsuccessful attempts to open assemblies, successful opening of assemblies, time periods associated with opening and closing of assemblies and other information that the at least one processor in the module has been programmed to store in the at least one data store.

In the exemplary embodiment the at least one computer 116 is operative to record this information along with information about the particular user and the session involved. Further in the exemplary embodiment the computer 116 may operate to cause the computer 138 to capture images related to the return of the electronic key module to the docking station.

In some embodiments the user returning the electronic key module may also be requested to provide other inputs through the input devices 120 of the customer terminal 126. These inputs may be operative to close the session. However, in other alternative embodiments the return of the electronic key module itself may be operative to close the session.

It should be understood that in the embodiment described, data is stored with regard to each session so that more careful tracking may be accomplished. This may be desirable for example if at a future date a safety deposit box user discovers that items are missing from their safety deposit box. In such circumstances the bank using the stored data, images and other information may determine when each safety deposit box was accessed or was attempted to be accessed. Through the use of this information the bank may be able to determine each instance of access as well as the identity of persons involved. Further as can be appreciated from the incorporated disclosures, such information and images may be accessed from locations disposed from the particular financial institution at which the system is installed. This may enable law enforcement officials or others to determine instances of activity related to particular safety deposit boxes. Of course these approaches are exemplary and in other embodiments other approaches may be used.

Thus the apparatus, system and methods of the exemplary embodiments described may achieve one or more of the above stated objectives, eliminate difficulties encountered in the use of prior devices and systems, solve problems and attain desirable results as described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations given herein are by way of examples and the invention is not limited to the details shown and described.

In the following claims any feature described as a means for performing a function shall be construed as encompassing any means known to those skilled in the art as being capable of performing the recited function, and shall not be limited to the features shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. Apparatus comprising:

a plurality of safety deposit boxes, each safety deposit box including:

a frame bounding an interior area, the frame defining an opening;

a door movably mounted in operative supported connection with the frame, wherein the door is movable between an open position wherein in the open position of the door the interior area is accessible through the opening, and a closed position wherein the door is operative to block the opening and the interior area is rendered inaccessible by the door;

at least one key lock, wherein the at least one key lock is operative in a locked condition to hold the door in the closed position, wherein the at least one key lock includes a key opening, wherein the at least one key lock is changeable by a key inserted in the key opening to an unlocked condition, wherein in the unlocked condition the door is movable between the closed position and the open position;

a body, wherein the body is movably mounted in operatively supported connection with the door, wherein the body is movable between a blocking position and an exposing position, wherein in the blocking position the body overlies the key opening and prevents key access thereto, and wherein in the exposing position the key opening is accessible to receive a key;

a cover lock, wherein the cover lock is in operative connection with the body, wherein the cover lock is changeable between a latched condition wherein the body is held in the blocking position, and an unlatched condition, wherein in the unlatched condition the body is movable between the blocking position and the exposing position;

a wireless indicator, wherein the wireless indicator is operative to output at least one signal corresponding to box identifying data, wherein the box identifying data is unique to one particular safety deposit box relative to the plurality of safety deposit boxes;

an electronic key module, wherein the electronic key module includes a reader operative to read the at least one signal, and wherein the electronic key module includes at least one processor and at least one data store, wherein the at least one data store includes programmed data, and wherein the at least one processor is operative to determine that the at least one signal and the programmed data have at least one relationship, and wherein the at least one processor is operative responsive to determining the at least one relationship, to cause the electronic key module to change the cover lock from the latched condition to the unlatched condition.

2. The apparatus according to claim 1 wherein the wireless indicator includes a radio frequency identification (RFID) device.

3. The apparatus according to claim 2 and further including an opening extending in the body, and wherein the electronic key module includes an extending portion, wherein the opening is operative to accept the extending portion therein.

4. The apparatus according to claim 3 wherein the cover lock is changed from the latched condition to the unlatched condition responsive to the extending portion of the electronic key module in the opening.

5. The apparatus according to claim 4 wherein the electronic key module includes at least one movable portion, wherein the electronic key module is operative to move the at least one movable portion responsive to determination of the at least one relationship by the at least one processor, wherein the at least one processor is operative to move the at least one movable portion to an actuating position, wherein responsive to the at least one movable portion in the actuating position the cover lock is changed from the latched condition to the unlatched condition.

6. The apparatus according to claim 5 and further comprising a catch, wherein the catch is releasibly engageable with the extending portion of the electronic key module, and wherein in the unlatched condition of the cover lock, the catch is operative to hold the extending portion in the opening.

7. The apparatus according to claim 6 wherein the catch includes at least one projection within the body, and wherein the extending portion of the electronic key module includes at least one recess, and wherein the catch is operative to hold the extending portion in the opening through engagement of the at least one projection and the at least one recess.

8. The apparatus according to claim 7 wherein the body is rotatably mounted in operative supported connection with the door, wherein the body is rotatable between the blocking position and the exposing position.

9. The apparatus according to claim 8 and wherein the catch comprises at least one member, wherein moving the body to the blocking position when the catch engages the electronic key module, is operative to cause the member to move wherein the catch is released.

10. The apparatus according to claim 9 and further comprising a base, wherein the base is in operative supported connection with the door, and wherein the base includes at least one aperture therein, wherein the key opening is accessible through the at least one aperture when the body is in the exposing position.

11. The apparatus according to claim 10 wherein the cover lock includes at least one bolt, wherein in the latched condition of the cover lock the at least one bolt operatively engages the body and the base.

12. The apparatus according to claim 11 wherein the at least one bolt of the cover lock includes two spaced portions, and wherein the extending portion of the electronic key module in the opening, extends in intermediate relation of the two spaced portions of the at least one bolt.

13. The apparatus according to claim 12 wherein the door includes a further key lock, and wherein the further key lock is in operative connection with the at least one key lock, and wherein the further key lock is changeable between a further locked condition and a further unlocked condition, wherein in the further locked condition of the further key lock, the at least one key lock is maintained in the locked condition, and wherein in the further unlocked condition of the further key lock, the at least one key lock is changeable between the locked and unlocked conditions responsive to the key, and wherein the further key lock includes a further key lock opening, and wherein the base includes at least one second aperture, wherein the further key lock opening is accessible through the at least one second aperture.

14. The apparatus according to claim 13 and further comprising at least one door hinge, wherein the door is rotatably mounted to the frame at a first side of the door through the at least one door hinge, and further comprising at least one body hinge, wherein the body is rotatably mounted relative to the base through the at least one body hinge, and wherein the at least one body hinge is positioned adjacent a second side of the door, wherein the second side is opposed of the first side of the door.

15. The apparatus according to claim 14 and further comprising a further key lock key portion, wherein the further key lock key portion extends in the further key lock opening and in the second aperture.

16. The apparatus according to claim 15 wherein the further key lock key portion is configured to retain the further key lock in the further unlocked condition, and wherein the base further includes a shroud, wherein the shroud overlies the further key lock key portion.

17. The apparatus according to claim 16 wherein the further key lock key portion comprises a bent key, and wherein the shroud overlies the bent key.

18. The apparatus according to claim 15 wherein the electronic key module further includes an electronic display, wherein the electronic display is in operative connection with the at least one processor, wherein the at least one processor is operative to cause at least one output through the electronic display.

19. The apparatus according to claim 18 wherein each one of the plurality of safety deposit boxes includes visible identifying indicia thereon, wherein the visible identifying indicia uniquely identifies each respective safety deposit box among the plurality of safety deposit boxes, and wherein the at least one output through the electronic display corresponds to the visible identifying indicia on at least one safety deposit box which the electronic key module is operatively programmed to cause the cover lock associated therewith to change from the latched condition to the unlatched condition.

20. The apparatus according to claim 19 wherein the at least one processor in the electronic key module is operative to cause the at least one output through the electronic display to be output in multiple orientations relative to the electronic key module.

21. The apparatus according to claim 20 wherein the electronic key module includes at least one sensor in operative connection with the at least one processor, wherein the at least one sensor is operative to sense orientation of the electronic key module, wherein the at least one processor is operative to change the at least one output through the electronic display responsive to at least one change in orientation of the electronic key module.

22. The apparatus according to claim 20 wherein the at least one output through the electronic display corresponds in orientation to the visible identifying indicia on the at least one safety deposit box which the electronic key module is operatively programmed to change the condition of the cover lock, when the extending portion of the electronic key module is oriented for insertion in the opening of the body of the at least one safety deposit box.

23. The apparatus according to claim 20 wherein the electronic key module further includes an audio output device, wherein the audio output device is in operative connection with the at least one processor.

24. The apparatus according to claim 23 wherein the at least one processor is operative to cause the audio output device to operate to provide at least one first audio output responsive to the at least one processor determining the at least one relationship.

25. The apparatus according to claim 24 wherein the at least one processor is operative to cause the audio output device to provide at least one second audio output responsive to reading through operation of the reader of the electronic key module, box identification data from a safety deposit box that the electronic key module is not operatively programmed to change the condition of the cover lock.

26. The apparatus according to claim 24 wherein the at least one processor is operative to cause the audio output device to provide at least one second audio output responsive to reading through operation of the reader of the electronic key module a wireless output device on a safety deposit box for which the electronic key module is not operatively programmed to change the condition of the cover lock to the unlatched condition.

27. The apparatus according to claim 23 wherein the at least one processor is operative responsive to instructions in the at least one data store, to make at least one further determination that the electronic key module has likely been taken away from proximity to the plurality of safety deposit boxes, wherein the at least one processor is operative to cause the at least one audio output device to operate responsive to the at least one further determination.

28. The apparatus according to claim 27 wherein the at least one processor includes a timer function, wherein the at least one processor is operative to make the at least one further determination responsive to operation of the timer function.

29. The apparatus according to claim 28 wherein the at least one processor is in operative connection with at least one sensor of the electronic key module, wherein the at least one sensor is operative to sense disengagement of the electronic key module and the body, and wherein the at least one processor is operative to cause the audio output device to operate at least one time period after disengagement responsive to operation of the timer function.

30. The apparatus according to claim 29 wherein the at least one sensor includes the reader.

31. The apparatus according to claim 27 wherein the electronic key module further includes at least one sensor for sensing at least one wireless signal, wherein the at least one processor is operative to cause the audio output device to operate responsive to at least one of the at least one sensor sensing the at least one wireless signal and the at least one sensor ceasing to sense the at least one wireless signal.

32. The apparatus according to claim 3 wherein the at least one processor of the electronic key module is operative to store in the at least one data store, a time value corresponding to a time of the extending portion of the electronic key module extending in the opening of at least one body.

33. The apparatus according to claim 1 wherein the at least one processor is operative responsive to the reader, to cause to be stored in the at least one data store, data corresponding to box identification data associated with each of a plurality of safety deposit boxes attempted to be opened using the electronic key module.

34. The apparatus according to claim 1 wherein the at least one processor is operative to determine at least one time corresponding to the cover lock being in the unlatched position.

35. The apparatus according to claim 1 and further comprising a docking station, wherein the electronic key module is operatively engageable with the docking station.

36. The apparatus according to claim 35 wherein the electronic key module includes at least one battery, wherein the at least one battery is in operative connection with the at least one processor, and wherein the docking station includes a battery charger, wherein the docking station is operative to charge the at least one battery when the electronic key module is engaged with the docking station.

37. The apparatus according to claim 35 wherein the electronic key module includes at least one connector, and wherein the docking station includes at least one mating connector, wherein the at least one mating connector is operatively releasibly engageable with the at least one connector, wherein the at least one processor is operative to communicate data through the at least one mating connector.

38. The apparatus according to claim 37 wherein the at least one mating connector comprises at least one of electrical contacts and a wireless connection.

39. The apparatus according to claim 37 and further comprising:

a customer terminal, wherein the customer terminal includes a computer, wherein the computer is in operative connection with the docking station;

wherein the computer is operative to cause data to be communicated between the computer and at least one processor of the electronic key module when the electronic key module is in operative connection with the at least one mating connector of the docking station.

40. The apparatus according to claim 39 wherein the computer is operative to cause selected programmed data to be stored in the at least one data store of the electronic key module.

41. The apparatus according to claim 40 and further comprising:

at least one input device in operative connection with the computer, wherein the at least one input device is operative to receive at least one identifying input from users;

a computer database in operative connection with the computer, wherein the computer database includes data corresponding to at least one identifying input associated with each of a plurality of authorized safety deposit box users, and for each of the plurality of authorized safety deposit box users, corresponding access data, wherein at least a portion of the access data corresponds to programmed data operative to cause the electronic key module to change the cover lock on a safety deposit box associated with the respective user, from the latched to the unlatched condition;

wherein responsive to at least one input through the at least one input device corresponding to an authorized safety deposit box user, the computer is operative to cause programmed data to be stored in the at least one data store of the electronic key module when engaged with the docking station, wherein the programmed data corresponds to the safety deposit box of the authorized safe deposit box user and is operative to cause the electronic key module to change the cover lock from the latched condition to the unlatched condition.

42. The apparatus according to claim 41 wherein the at least one input device comprises at least one of a card reader, a keypad, a signature pad and a biometric reader.

43. The apparatus according to claim 42 wherein the docking station includes at least one visual indicator, and wherein the computer is operative to cause the at least one visual indicator to operate responsive to transferring the programmed data associated with the respective safety deposit box of the authorized safety deposit box user, to the at least one data store of the electronic key module.

44. The apparatus according to claim 43 wherein the computer is operative to receive data from the at least one data store in the electronic key module when the electronic key module is operatively engaged with the docking station, wherein the computer is operative to cause use data associated with the electronic key module to be stored in the database, wherein the use data corresponds to at least one of identifying data associated with each safety deposit box the electronic key module was engaged with, at least one time when the electronic key module was operative to cause a cover lock to be changed to the unlatched condition, and a time associated with a cover lock in the unlatched condition;

and wherein the computer is operative to cause the use data to be stored in association with data corresponding to the authorized safety deposit box user.

45. The apparatus according to claim 39 and further comprising a vault, wherein the plurality of safety deposit boxes are located within the vault, and further comprising a gate, wherein the gate is operative to control access to the vault, and further comprising a gate lock in operative connection with the gate, wherein the gate lock is in operative connection with the computer, and wherein the computer is operative to cause the gate lock to be changed between locked and unlocked conditions.

46. The apparatus according to claim 45 wherein the computer is operative to cause the gate lock to change from the locked condition to the unlocked condition responsive to the electronic key module being disengaged from the docking station.

47. The apparatus according to claim 45 and further comprising:

a video recording device;

at least one camera operative to capture images of activities in the vault, wherein the at least one camera is in operative connection with the video recording device;

wherein the video recording device is in operative connection with the computer and is operative to record at least one image.

48. The apparatus according to claim 47 wherein the computer is operative to cause the video recording device to operate responsive to at least one of:

the electronic key module being disconnected form the docking station;

the gate lock changing between the locked condition and the unlocked condition;

at least one input being provided through the at least one input device;

opening of the gate; and closing of the gate.

49. The apparatus according to claim 1 wherein the electronic key module further includes an electronic display, wherein the electronic display is in operative connection with the at least one processor, wherein the at least one processor is operative to cause at least one output through the electronic display.

50. The apparatus according to claim 49 wherein each of the plurality of safety deposit boxes has visible identifying indicia thereon, wherein the visible identifying indicia uniquely identifies the respective safety deposit box among the plurality of safety deposit boxes, and wherein the at least one output through the electronic display corresponds to visible identifying indicia on the at least one safety deposit box on which the electronic key module is operatively programmed to change the cover lock thereon from the latched condition to the unlatched condition.

51. The apparatus according to claim 49 wherein the at least one processor of the electronic key module is operative to cause the at least one output through the electronic display to be output in multiple orientations.

52. The apparatus according to claim 1 wherein the electronic key module further includes an audio output device, wherein the audio output device is in operative connection with the at least one processor.

53. The apparatus according to claim 52 wherein the at least one processor is operative to cause the audio output device to operate to provide at least one first audio output responsive to the at least one processor determining the at least one relationship.

54. The apparatus according to claim 52 wherein the at least one processor is operative responsive to data stored in the at least one data store, to make at least one determination that the electronic key module has been taken away from proximity to the plurality of safety deposit boxes, wherein the at least one processor is operative to cause the audio output device to operate responsive to the at least one determination.

55. The apparatus according to claim 54 and further comprising a docking station, wherein the electronic key module is operatively engageable with the docking station, wherein the at least one processor is operative responsive to the electronic key module being operatively engaged with the docking station to cause the at least one processor not to make a further determination that the electronic key module has been taken away from proximity to the plurality of safety deposit boxes.

56. The apparatus according to claim 1 and further comprising a docking station, wherein the electronic key module is operatively connectable with the docking station, wherein the electronic key module includes at least one connector, wherein the docking station includes at least one mating connector releasibly connectable with the at least one connector, wherein the at least one processor is operative to communicate data through an operatively engaged at least one connector and at least one mating connector.

57. The apparatus according to claim 56 and further comprising:

a customer terminal, wherein the customer terminal includes a computer, wherein the computer is in operative connection with the docking station;

wherein the computer is operative to cause data to be communicated between the at least one processor of the electronic key module and the computer when the electronic key module is in operative connection with the docking station, and wherein the computer is operative to cause selected programmed data to be stored in the at least one data store of the electronic key module.

* * * * *

UNITED STATES PATENT AND TRADEMARK OFFICE

CERTIFICATE OF CORRECTION

PATENT NO. : 7,607,573 B1
APPLICATION NO. : 12/004758
DATED : October 27, 2009
INVENTOR(S) : Gromley et al.

It is certified that error appears in the above-identified patent and that said Letters Patent is hereby corrected as shown below:

Title Page, Item (75) Inventor is corrected to read:
-- Neil Gromley, Kensington (OH);
Todd Christian, Dalton (OH);
James Pellegrene, North Canton (OH);
Dustin Cairns, Deerfield (OH);
Gary Baker, Bolivar (OH) --.

Signed and Sealed this
Sixth Day of October, 2015

Michelle K. Lee
*Director of the United States Patent and Trademark Office*